United States Patent
San Martin et al.

(10) Patent No.: US 11,487,039 B2
(45) Date of Patent: Nov. 1, 2022

(54) MULTI-COIL TOOL FOR ATTENUATION OF MOTION-INDUCED NOISE DURING REMOTE FIELD TESTING OF PIPE

(71) Applicant: Halliburton Energy Services, Inc., Houston, TX (US)

(72) Inventors: Luis Emilio San Martin, Albuquerque, TX (US); Burkay Donderici, Pasadena, CA (US); Freeman Hill, Spring, TX (US); Thomas Louis Joseph Yonley, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/647,790

(22) PCT Filed: Oct. 16, 2017

(86) PCT No.: PCT/US2017/056719
§ 371 (c)(1),
(2) Date: Mar. 16, 2020

(87) PCT Pub. No.: WO2019/078807
PCT Pub. Date: Apr. 25, 2019

(65) Prior Publication Data
US 2020/0217982 A1    Jul. 9, 2020

(51) Int. Cl.
*G01V 3/28*    (2006.01)
(52) U.S. Cl.
CPC ..................... *G01V 3/28* (2013.01)

(58) Field of Classification Search
None
See application file for complete search history.

(56) References Cited

U.S. PATENT DOCUMENTS

| 4,157,495 A | 6/1979 | Grover et al. |
| 4,636,728 A | 1/1987 | Compton et al. |
| 5,289,151 A | 2/1994 | Turner |
| (Continued) | | |

OTHER PUBLICATIONS

EP Application No. 17929264.4, Extended European Search Report, dated Feb. 3, 2021, 8 pages.

(Continued)

*Primary Examiner* — Douglas X Rodriguez
(74) *Attorney, Agent, or Firm* — Delizio, Peacock, Lewin & Guerra

(57) ABSTRACT

A system includes a tool to dispose in a wellbore lined with pipe. The tool includes first and second receiver coils having a non-uniform winding along a longitudinal axis, a third receiver coil having a non-uniform winding coaxial with at least one of the first and second receiver coils, and a transmitter. The system includes a processor to execute instructions to perform operations including causing the transmitter to emit an induced magnetic field, measuring the induced magnetic field using the first receiver coil to create a first measurement and using the first and second receiver coils to create a second measurement. The operations include determining a static magnetic field, selecting the first or second measurement based on a magnitude of the static magnetic field to determine a selected measurement, and determining at least one property of the pipe using the selected measurement.

21 Claims, 15 Drawing Sheets

(56) References Cited

U.S. PATENT DOCUMENTS

| | | |
|---|---|---|
| 2003/0229450 A1 | 12/2003 | Strickland |
| 2004/0061622 A1 | 4/2004 | Clark |
| 2007/0257679 A1 | 11/2007 | Fanini et al. |
| 2008/0079431 A1 | 4/2008 | Dashevsky et al. |
| 2009/0195244 A1 | 8/2009 | Mouget et al. |
| 2016/0160629 A1* | 6/2016 | Donderici ............... E21B 47/00 |
| | | 324/238 |
| 2016/0168974 A1* | 6/2016 | Donderici ............... G01N 27/90 |
| | | 324/238 |
| 2016/0245779 A1 | 8/2016 | Khalaj Amineh et al. |
| 2017/0254916 A1* | 9/2017 | Yu ........................... E21B 47/12 |
| 2019/0219723 A1 | 7/2019 | Yonley |

OTHER PUBLICATIONS

PCT Application Serial No. PCT/US2017/056719, Written Opinion dated Jan. 8, 2018, 13 pages.

PCT Application Serial No. PCT/US2017/056719, International Search Report dated Jan. 8, 2018, 4 pages.

Arbuzov, et al., "Memory Magnetic Imaging Defectoscopy", SPE Russian Oil and Gas Exploration and Production Technical Conference and Exhibition, Oct. 16-18, Moscow, Russia, 2012, 10 pages.

Zhang, et al., "Successful Application of a New Electromagnetic Corrosion Tool for Well Integrity Evaluation in Old Wells Completed with Reduced Diameter Tubular", International Petroleum Technology Conference, Mar. 26-28, Beijing, China, 2013, 12 pages.

\* cited by examiner

MULTI-COIL TOOL FOR ATTENUATION OF MOTION-INDUCED NOISE DURING REMOTE FIELD TESTING OF PIPE

BACKGROUND

The disclosure generally relates to the remote field testing of pipe, and more particularly reducing motion-induced noise during remote field testing of pipe.

Corrosion and degradation of physical structures are frequent side-effects of exposure to harsh conditions. Such conditions can be found at a gas processing facility or surrounding a tubular system that has been drilled through a subsurface formation. Naturally occurring chemicals found in the subsurface such as hydrogen sulfide as well as injected chemicals such as hydrochloric acid can have a deleterious effect on physical structures. These physical structures, which can include tubing, sensors, equipment, etc., can serve a critical purpose in the field. In some instances, a single defect anywhere along thousands of meters of piping could increase the risk of an accident or environmental incident. Remote field testing for a defect could mitigate these risks by finding these defects before any incident takes place. One method for remote field testing is the use of induced eddy current techniques either in the time or frequency domain for detecting concentric pipes.

Remotely detecting the flaws and degradation of a structure such as a tubular system in a subsurface environment can be challenging due to the previously mentioned length of the pipe system as well due to the thickness of the pipes in the pipe system. One way of testing for defects is to use a tool that can transmit a signal from a transmitter and detect the signal at a receiver after the signal has passed through the pipes. However, the pipe thicknesses can attenuate the signal detected by the receiver. Moreover, the length of a pipe system requires that the receiver must be able to measure properties while continuously moving in order to find defects anywhere along the entire length of the pipe system in a practical amount of time. Movement along the pipe system can induce significant noise in the measurement which can be greater than the expected signal to be detected.

BRIEF DESCRIPTION OF THE DRAWINGS

Embodiments of the disclosure can be better understood by referencing the accompanying drawings.

DESCRIPTION

Figure 1:
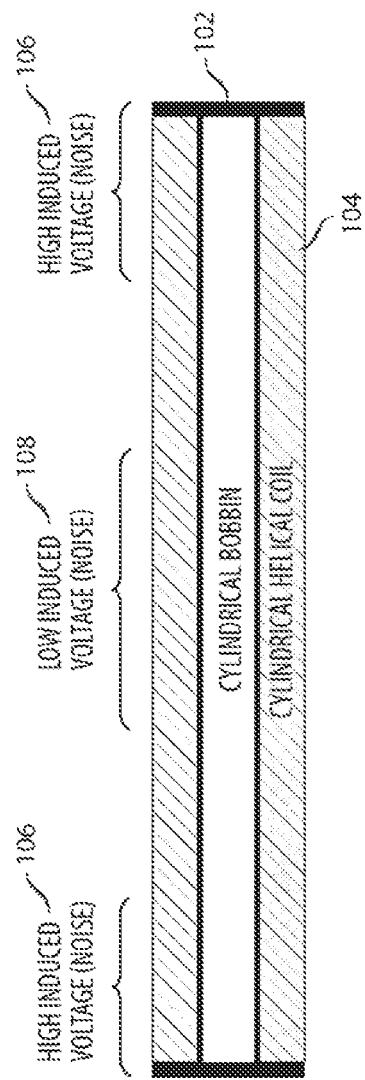
FIG. 1 depicts an example receiver coil.

The description that follows includes example devices, methods, techniques, and program flows that embody embodiments of the disclosure. However, it is understood that this disclosure can be practiced without these specific details. For instance, this disclosure refers to measuring the outer diameter of a pipe in a wellbore in illustrative examples. Embodiments of this disclosure can be instead applied to measuring the corrosion of pipe systems under exposure to a harsh, high-temperature environment or to materials surrounded by a magnetic field. In other instances, well-known instruction instances, protocols, structures and techniques have not been shown in detail in order not to obfuscate the description.

Various embodiments disclosed herein include multi-coil configurations to attenuate motion-induced noise during remote field testing of pipe. Pipe herein can include one or more types of tubulars provided in a wellbore, and can include, but is not limited to casings, tubing, production tubing, jointed tubing, coiled tubing, liners, combinations thereof, or the like. Wellbores are often provided with long extended portions containing pipe. Accordingly, testing of the pipe can be required at various times to determine parameters of the piping, for example the presence or extent of corrosion, thickness, or other characteristics. As stated above, in practice for long pipes, stationary measurements are not practical. Instead, measurements must be made while continuously moving such that the entire length of the pipe can be measured in a reasonable amount of time. However, an undesired consequence can be the presence of noise in such measurements. In the oil industry, production casing (for well completions) can be many thousands of feet long. Continuous measurements at a rate of 5 ft/min (~1.5 m/min, 1 inch per second, or ~2-3 cm/s) or faster are generally required, with measurement coils located inside the innermost pipe. Moreover, production casing often has multiple concentric pipes, where the magnetic signals from the outer pipe are at very low levels.

Some embodiments can be used to detect metal loss in multiple concentric pipes. The problem of detecting metal loss in applications with multiple concentric pipes having a certain level of thickness is that a tool or probe performing the detection needs to be able to acquire and process very small signals. For instance, the thickness of these pipes can be more than two inches and as much as four inches in some situations. The signal used to determine metal loss in the outermost pipe has to travel across all pipes to the receiver coils in the tool. To reach and bring back information about the outermost pipe, the electromagnetic (EM) signal has to travel the full thickness of the pipes twice, once from the transmitter to the outermost pipe and another from the pipe to the receiver coils in the tool.

The EM waves can travel across the pipes walls using low frequencies capable of traveling the distance across the metal without being completely attenuated. The attenuation across the metal can be estimated from the skin depth δ of the specific type and length of the metal walls. The skin depth δ is defined as:

$$\delta = \frac{2}{\sqrt{\omega\mu\sigma}} \quad (1)$$

where ω is the angular frequency, σ is the electrical conductivity, and μ is the magnetic permeability. The skin depth can be used as a measure of how much the signal attenuates as it travels across the metal. The attenuation across metal is exponential and can have the form $e^{-x/\delta}$, where x is the distance across the metal. The large attenuation that affects the signals in this problem leads efforts to reduce sources of error can make the difference between detecting and not detecting a defect in the outermost pipe.

Additionally, solenoid receivers, such as those used in induction corrosion detection tools, can experience a significant source of error while moving through a position-dependent static magnetic field caused by the magnetization of the pipes. This error depends on the logging speed and generally affect lower frequencies.

As a receiver coil moves into and out of these static field regions, voltage is generated on the coil, which appears as noise on top of the desired measurement. In many cases, this "motion-induced noise" is not only the largest noise source, it can be greater than the expected signal to be measured—this is particularly true when attempting measurements of very thick or outermost pipe which require very low frequency measurements.

In general, this kind of "motion-induced noise" appears over a broad frequency range, but in practice, it tends to exhibit a characteristic 1/f shape (it is higher as the frequency decreases). Thus, the worst case highest noise generally coincides with the worst case lowest expected signal to measure (corresponding to the weakest signals from the outermost pipe), which can degrade the quality of measurement and/or force logging speeds to be reduced to achieve acceptable measurements.

The typical equation governing induced voltage on a coil comes from Faraday's Law:

$$\varepsilon = -A * N * d\Phi_B/dt \quad (2)$$

For a coil with N identical turns and a cross sectional area A, where ΦB is magnetic flux, Equation 2 yields an induced voltage ε. The induced voltage is proportional to the change in magnetic flux per unit time.

In the case of an oil-industry corrosion evaluation and monitoring tool, because the signals being measured are very weak, coils with thousands of turns are required to detect the weak signals. Because receiver coils must fit inside a narrow diameter pipe, coils are constrained to a small outer diameter. This naturally results in coils which are much longer than they are wide—for example, a length of ~8 inches (~20-21 cm), and a diameter of ~1 inch (~2-3 cm).

From experimental data, it is observed that the localized static magnetized regions can randomly vary in size, and by wide margins. These can be very small (less than one inch, or less than 2-3 cm) or much larger (multiple feet or meters) or any distance in-between. It is reasonable to believe that some lengths of magnetization will tend to be more problematic than others. To find a useful trend in this regard, the optimal size of a magnetized region for generating noise is determined.

For this analysis, lowest excitation frequency (and therefore lowest and most critical frequency of interest) for measuring an outer pipe is fixed to a certain frequency such as ~1 Hz. Additionally, the assumed speed is set to ~1 inch (~2-3 cm) per second (5 ft/min, ~1.5 m/min). Both factors are exemplary only, and will change to the specific circumstances of the pipe/structure being analyzed. Given a 1 Hz frequency and ~1 inch/s (~2-3 cm/s) speed, there will exist a small magnetized region which has a length which is optimal for generating noise at exactly the frequency of interest; this length will be small—somewhere around ~1 inch (~2-3 cm). In practice, the identification of this optimal region length can be approximated.

This noise at the lowest frequency of interest is the most difficult noise to filter out, and hence represents the "worst case," and also represents where improved performance is most needed. Therefore, efforts can be focused on reducing noise effects from the identified region length—in this example, the small ~1 inch (~2-3 cm) magnetized regions.

For a small magnetized region, only a small part of the coil will "see" the static field resulting from structural defects in the pipe at any given time because the length of the receiver coil is much longer than the length of the magnetized region. Therefore, the voltage generated (which can include noise) can be considered to be proportional to turn density (turns per inch, centimeter, or any other point of measurement) over the static magnetized region. Because of this proportional relationship, N (the number of turns) in Equation 2 can be replaced with n (turn density), resulting in:

$$\varepsilon = -A * n * d\Phi_B/dt \quad (3)$$

Moreover, because at issue is a static magnetized region (rather than a time varying magnetic field) where the coils are moving over the magnetized region, the magnetic flux (ΦBs can be substituted in thereby indicating a static field. Faraday's equation can then be rearranged to match the situation as described (of coils passing over a stationary magnetic field). The new rearranged equation shows that the voltage generated is proportional to the change of turn density times area (through the static field) per unit time:

$$\varepsilon = -\Phi_{Bs} * d(A*n)/dt \quad (4)$$

In Equation 4, the change of turn density times area per unit time, d(A*n)/dt, is proportional to the velocity of the coil as the coil moves from a non-magnetized region into a magnetized region. For a typical helical coil in a solenoid, there can be thousands of turns of equal area which are equally distributed over the length of the coil, such that beyond either end of the coil (that is, beyond the helical coil), the turn density is zero, and inside the coil ends the turn density is uniformly high. Likewise, referring to Equation 3, the change in coil density within the equally distributed coil is zero (because the coil is equally distributed).

Given the above considerations, two useful generalizations herein can be made regarding the nature of induced noise from a ~1" (~2-3 cm)×8" (~20-21 cm) coil moving through a small ~1 inch (~2-3 cm) magnetized region at a constant velocity of ~1 inch/s (~2-3 cm/s): (1) The highest induced noise voltage can be expected to occur as the end of the coil passes into or out of the small magnetized region corresponding to a pipe defect because this is the region with the highest dn/dt; and (2) While the small magnetized region is located near the center of the coil, there is little or no induced noise voltage, because dn/dt is (ideally) zero (as long as the velocity is constant).

To illustrate, FIG. 1 depicts an example receiver coil. The above two observations are further represented in FIG. 1, where the receiver coil 100 is a standard solenoid having a cylindrical bobbin 102 and a cylindrical helical coil 104 wrapped around the cylindrical bobbin 102. The annotations in FIG. 1 note the relatively high induced noise voltage 106 on the edges of the coil 104 and the relatively low induced noise voltage 108 in the middle of the coil 104.

Figure 2:
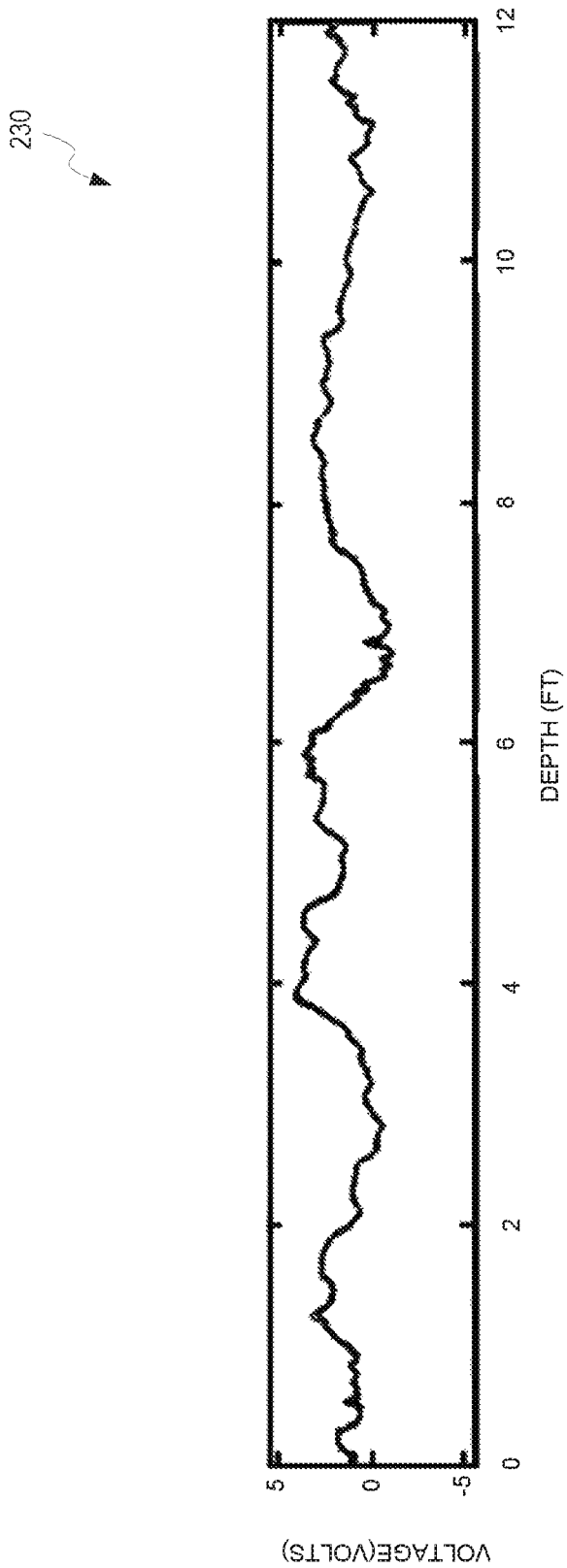
FIG. 2 depicts an example graph of voltages induced by a static magnetic field measured by the receiver coil of FIG. 1 relative to the depth of the solenoid as the receiver coil is moving (e.g., being lowered) in a wellbore cased in pipe.

FIG. 2 depicts an example graph of voltages induced by a static magnetic field measured by the receiver coil of FIG. 1 relative to the depth of the solenoid as the receiver coil is moving (e.g., being lowered) in a wellbore cased in pipe. In particular, FIG. 2 depicts a graph 230 illustrating voltages induced by a static magnetic field as a result of the receiver coil moving along different depths of the wellbore. The induced voltage measured by the receiver coil shown in FIG. 2 are not based on a signal emitted by an excitation transmitter. Rather, the induced voltage is a consequence of the spatial variations of the static field. This static field in the presence of movement of the receiver coil induces a voltage (as shown in FIG. 2) in the receiver coil. This static magnetic field can cause significant noise, reducing the sensitivity of the receiver coils towards measuring desired pipe parameters in the wellbore (e.g., pipe corrosion).

In particular, the sum of the magnetic flux experienced by each turn in the coil 4) is equal to the average magnetic field B multiplied by the area of a single turn of the coil A and the number of turns N, as expressed by Equation 5:

$$\phi = \int_S B \, dA = NAB \quad (5)$$

After applying Faraday's law, it can be found that the induced voltage from a static magnetic field $V_{Rx}$ is equal to the time derivative of magnetic flux. If it is assumed that a receiver coil is moving through a pipe at a constant speed v, then Equation 6 can be used to define the following relationship, where Z is the axial position along the pipe:

$$V_{Rx} = -\frac{d\phi}{dt} = -v\frac{d\phi}{dZ} \quad (6)$$

Combining Equation 5 and Equation 6 and re-arranging results in Equation 7:

$$V_{Rx} = vNA\frac{dB_{st}}{dZ} \quad (7)$$

The part of the voltage error that couples to the frequencies of operation of a tool is the variation of the voltage as a function of time. Thus, the following relationship defined by Equation 8 can be obtained:

$$\frac{dV_{Rx}}{dt} = v\frac{dV_{Rx}}{dZ} = \\ -v\left(\frac{dv}{dZ}NA\frac{dB_{st}}{dZ} + v\frac{dN}{dZ}A\frac{dB_{st}}{dZ} + vN\frac{dA}{dZ}\frac{dB_{st}}{dZ} + vN\frac{dA}{dZ}\frac{d^2B_{st}}{dZ^2}\right) \quad (8)$$

An observation of the above relationships suggests a number of ways to reduce voltage changes at the ends of a receiver coil including the following: 1) reducing coil speed, 2) degaussing the pipe directly by placing a degaussing device either above or in the proximity of the tool or probe, 3) reducing the area of the receiver coil, and 4) reducing the spatial change in turns $$\frac{dN}{dZ}$$

over the length of the coil. In a cylindrical coil, the value $$\frac{dN}{dZ}$$

approaches a spiked delta function at the ends of the cylindrical coil due to the abrupt change from zero turns to a great number of turns.

In view of the above, receiver coils with non-uniform windings can provide signals that can be processed to more accurately determine parameters of the pipe in the wellbore. A coil with a non-uniform winding can have a turn density that does not dramatically increase or decrease at the ends of the coil, wherein a turn density is defined as the number of turns per unit of length. If the turn density is low near the ends of a coil and gradually increases towards the middle, a reduced voltage change can result. Moreover, by using overlapping shaped coils that non-cylindrical coils provide in confined spaces, further noise-attenuating techniques can be applied to better determine parameters of the pipe. Parameters of a pipe can include any measurable factor, including attributes, material properties, etc. For example, such parameters can include the presence or extent of corrosion, thickness, or other characteristics.

Accordingly, various embodiments include methods, systems, and computer-readable storage devices that use a tool or probe having a multi-coil configuration (described in more detail below). The use of this multi-coil tool can significantly reduce error caused by movement of the tool through static magnetization of regions of pipe being tested. Thus, these various embodiments can help provide a better and more accurate assessment of parameters of the pipe (e.g., corrosion). Also, this multi-coil tool can be used to collect more diverse data regarding the pipes. This diverse data can provide additional data for resolving multiple unknown parameters.

Additionally, various depths of penetration of the pipes can be achieved based on the spacing between the coils and the length of the coils. For example, the tool can be configured in a shallow mode for a shorter depth of focus to inspect the inner-most pipes. On the other hand, the tool can be configured in a deep mode for longer depth of focus to inspect the outer-most pipes. The inner-most pipes can first be inspected using the shallow mode. This inspection of the inner-most pipes can then be used to provide a more accurate inspection of the outer-most pipes using the deep mode.

In some embodiments, the multi-coil tool can include an upper solenoid and a lower solenoid. A signal detected by the upper solenoid can be subtracted from a signal detected by the lower solenoid to create a signal that is sensitive to defects in the pipe. Additionally, the sum of the signals from the upper and lower solenoids can be highly sensitive to the presence of defects near the center of the multi-coil tool.

Thus, using various embodiments, the size of smaller defects in the pipe (outer and inner portions) can be detected and estimated. Accordingly, more valid predictions can be performed on the useful lifetime of the pipe (e.g., tubing, casings, etc.) or a decision can be made for replacing the flawed sections of the pipe.

Example Wireline System

Figure 3:
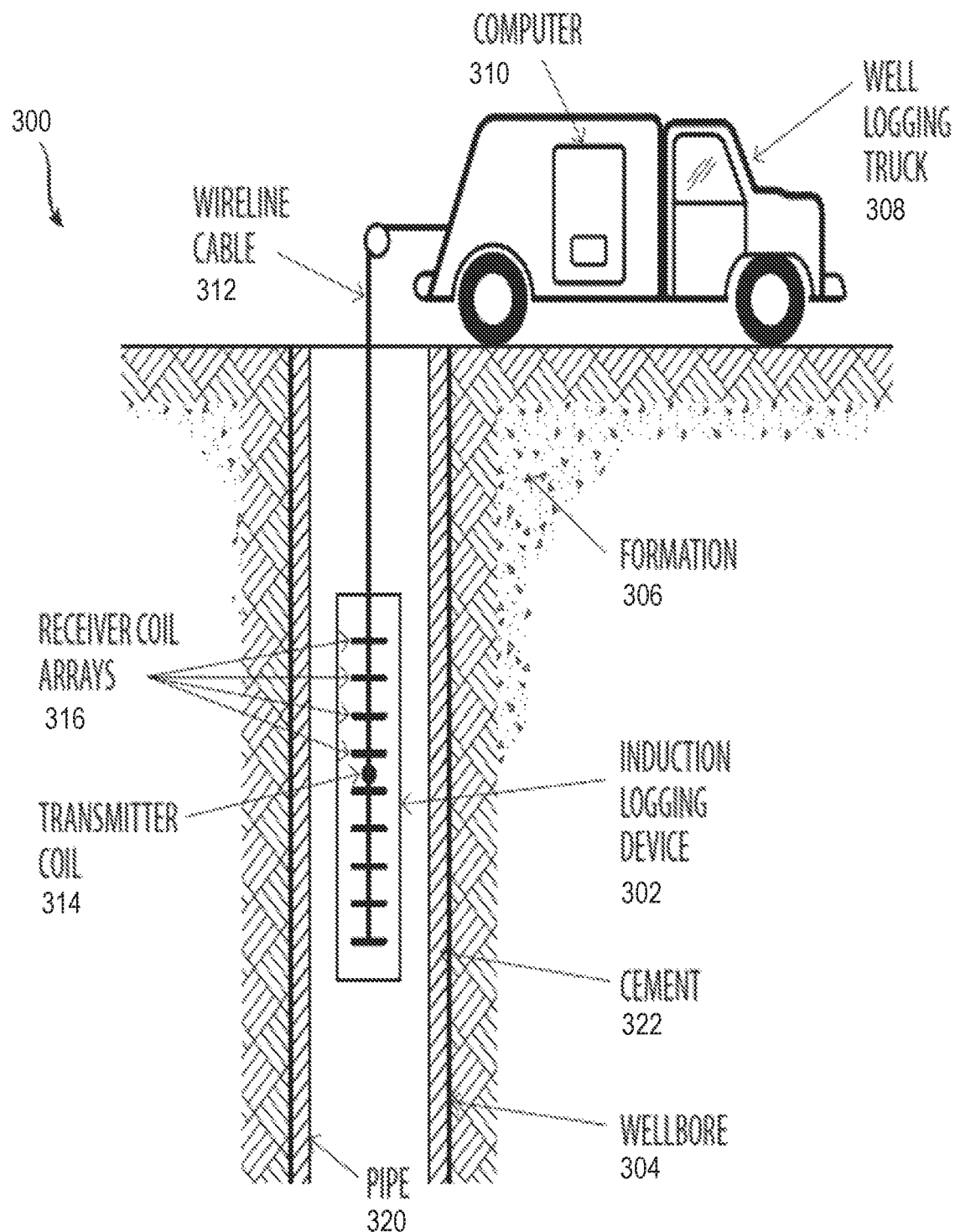
FIG. 3 depicts an example wireline system, according to some embodiments.

FIG. 3 depicts an example wireline system, according to some embodiments. In particular, FIG. 3 depicts a wireline logging system 300, where a tool or probe that includes a "transmit coil" and one or more "receive coils" is fed through a structure to detect defects. The transmit coil itself could be used as a receive coil depending on the desired system configuration.

As shown, the wireline logging system 300 comprises an induction logging device 302 disposed in a wellbore 304 which penetrates a formation 306. The wellbore 304 can include a pipe 320, also referred to as a casing, which can be cemented into place in at least a portion of the wellbore 304 by cement 322. The pipe 320 can include multiple layers of concentric pipes with inner outer pipes. The induction logging device 302 is connected by a wireline cable 312 to a well-logging truck 308 located at the rig site. The wireline cable provides power to the induction logging device 302 and is used to transmit measurements taken from the device to the well-logging truck 308. The well-logging truck 308 contains a computer 310 that receives the measurements, preferably stores the measurements, and utilizes the measurements identify defects within the pipe 304.

The induction logging device 302 can include a transmitter coil 314 and one or more receiver coil arrays 316 attached to a support. Although not specially shown, each receiver coil array 316 can include a main coil and a bucking coil connected in series. The bucking coil is designed to remove any direct coupling between the transmitter coil 314 and the main coil.

The wireline logging system 300 can provide support for the tool, as well as enabling communication between the tool processors on the surface outside the wellbore 304 and providing a power supply. The wireline logging system 300 can include any downhole conveyance such as wire, cable, e-line, slickline, braided line, metallic wire, non-metallic wire, or composite wire, single or multiple strands, as well as tubing, coiled tubing, joint tubing, pipe, or other tubular, combinations thereof, and the like. The wireline logging system 300 can include fiber optic cabling for carrying out communications. The optical cable can be provided internal or external of the wireline logging system 300. The wireline logging system 300 is sufficiently strong and flexible to tether the downhole tool unit through the wellbore 304, while also permitting communication through the wireline logging system 300 to surface tools unit, such as the well-logging truck 308.

The induction logging device 302 can be lowered within the wellbore 304 and pipe 320 at any speed suitable for the particular environment and circumstance. However, as examples, the induction logging device 302 can below lowered at a rate of from ~0.5 inches (~1-2 cm) per second to ~5 inches (12-13 cm) per second, or alternatively from ~1 inch (~2-3 cm) per second to ~3 inches (7-8 cm) per second, or alternatively can be lowered at a rate of at least ~1 inch (~2-3 cm) per second, or can be any of the aforementioned or between such ranges.

Example Coils

Probes or tools having a multi-coil configuration, according to different example embodiments, are now described.

Any dimensions below are intended to provide examples of how the shape of the non-uniform coils can be formed or arranged with respect to each other. Accordingly, although specific dimensions are mentioned, other dimensions (e.g., lengths, circumferences) can be used so as to achieve the described shapes.

A shaped coil can be defined as any coil having a non-uniform winding to a received signal (e.g., a magnetic field). A coil having a non-uniform winding can include a coil having a non-uniform turn density and/or a non-uniform cross-sectional winding area. For example, a shaped coil can include any coil where the effective turn density multiplied by the effective cross-sectional winding area varies over the length of the coil. In some embodiments, a shaped coil can be defined as any coil that varies in the number of turns along its longitudinal axis. This is in contrast to a cylindrical coil, wherein the number of turns is constant along the longitudinal axis. In some embodiments, the number of turns of a shaped coil linearly increases from 1 turn at a first end of the shaped coil to 1000 turns at the other end of the shaped coil. The number of turns of a shaped coil can quadratically increase from 1 turn at a first end of the shaped coil to 1000 turns at a first axial position (e.g., the middle) and then linearly decreases from 1000 turns at the first axial position to 1 turn at the other end of the shaped coil. Related to the number of turns for a coil is the turn density, defined as the number of turns for a coil per unit of length.

In FIGS. 4-11, the number of turns at an axial position for each coil is abstractly represented by the thickness of each coil. In some embodiments, the increasing thickness of a shaped coil along the axis of the shaped coil represents an increasing number of turns of the shaped coil along the axis. A decreasing thickness of a shaped coil along the axis of the shaped coil represents a decreasing number of turns of the shaped coil along the axis. It some embodiments, the thicknesses of the coils can also depict the physical coil thickness at an axial position.

Figure 4:
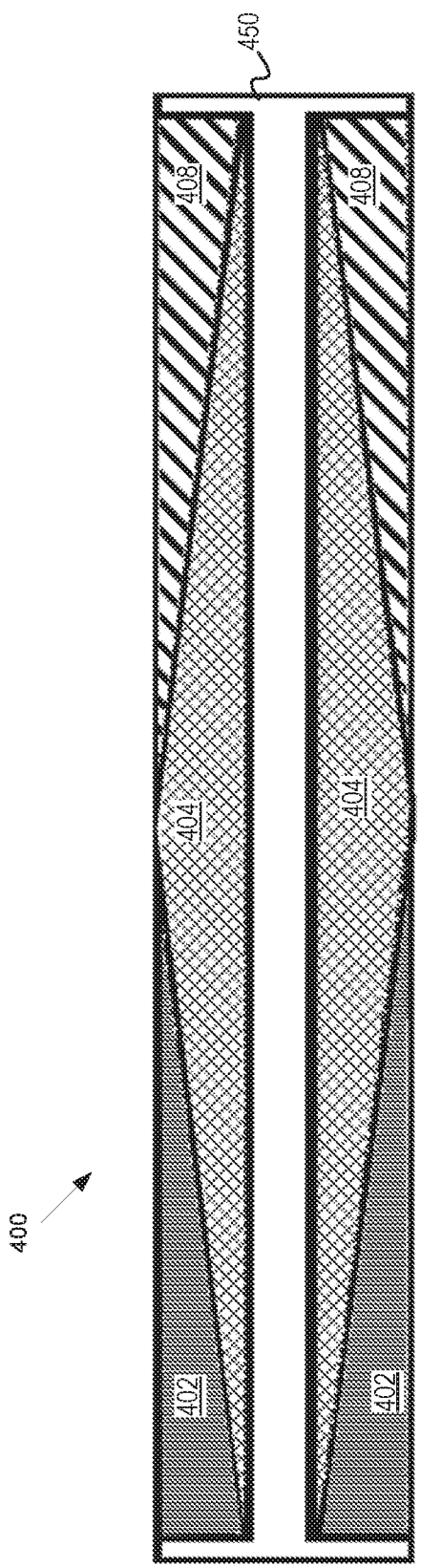
FIG. 4 depicts an example probe having three shaped coils, according to some embodiments.

FIG. 4 depicts an example probe having three shaped coils, according to some embodiments. FIG. 4 depicts a cross-sectional diagram of a probe 400 including three shaped coils. A lower shaped coil 404 winds around a cylindrical bobbin 450 starting at the left edge of the cylindrical bobbin 450 to the right edge of the cylindrical bobbin 450. The number of turns of the lower shaped coil 404 linearly increases from 1 turn to N (e.g., 999) turns from the left edge of the cylindrical bobbin 450 to the axial center of the cylindrical bobbin 450. From the axial center of the cylindrical bobbin 450 to the right edge of the cylindrical bobbin 450, the number of turns of the lower shaped coil 404 linearly decreases from N turns to 1 turn.

A left upper shaped coil 402 wraps around the lower shaped coil 404 starting at the left edge of the cylindrical bobbin 450 and ending at the axial center of the cylindrical bobbin 450. The left upper shaped coil 402 wraps N turns around the lower shaped coil 404 at the left edge of the cylindrical bobbin 450. The number of turns of the left upper shaped coil 402 can then linearly decrease as the coil is approaching the axial center of the cylindrical bobbin 450. For example, the number of turns at the left edge of the lower shaped coil 404 is 999, and the number of turns at the axial center of the cylindrical bobbin 450 is 1.

A right upper shaped coil 408 wraps around the lower shaped coil 404 starting at the axial center of the cylindrical bobbin 450 and ending at the right edge of the cylindrical bobbin 450. The right upper shaped coil 408 wraps once around the lower shaped coil 404 at the axial center of the cylindrical bobbin 450 and the number of turns of the right upper shaped coil 408 can then linearly increase as the coil is approaching the right edge of the cylindrical bobbin 450 until wrapping N turns around the lower shaped coil 404. For example, the number of turns at the axial center of the cylindrical bobbin 450 is 1, and the number of turns at the right edge of the cylindrical bobbin 450 is 999.

In some embodiments, the total turn density is defined as the sum of the turn density of each coil at an axial position. It can be observed from the embodiments described above that a change in total turn density can be described as low when the total number of turns at an axial position does not substantially vary along the longitudinal axis. In some embodiments, the total number of turns is considered to not substantially vary along the longitudinal axis when the total number of turns does not fall above or below a mean value by a threshold percentage of the mean value along the longitudinal axis beyond the two edges of the of the combined coils. In some embodiments, the threshold percentage is equal to 5%. The threshold percentage can also be equal to other values (e.g., 7%, 10%, 15%, etc.). In some embodiments, a region of the probe can be described as cylindrical when the total density is considered to not substantially vary along the longitudinal axis in that region.

In this example, the left and right halves of the probe 400 are symmetric. One set of example dimensions can set the center shaped coil to be 8 inches long and linearly increase from a 1-inch coil circumference to a 2-inch coil circumference along the left 4 inches of the center shaped coil before linearly decreasing down to a 1-inch coil circumference along the right 4 inches of the center shaped coil. In some other embodiments, the probe can be asymmetric. For example, the center shaped coil can instead increase from a 1-inch coil circumference to 2-inch coil circumference along the left 1 inch of the center shaped coil before decreasing back down to a 1-inch coil circumference along the right 7 inches of the center shaped coil.

Each shaped coil can measure a voltage (in response to a received signal) independent of any other coil. In this example, the left upper shaped coil 402 can measure a voltage W2. The lower shaped coil 404 can measure a voltage W1. The right upper shaped coil 408 can measure a voltage W3. The measured voltages W1, W2, and W3 can be used to determine parameters of the surrounding pipe. For example, with reference to FIG. 3, the induction logging device 302 can include the probe 400. The measured voltages W1, W2, and W3 measured by shaped coils in the probe 400 can be used to determine various attributes (e.g., defects) in the pipe 304. Also, each of the coils 402, 404, and 408 can measure a voltage either simultaneously or sequentially. The measure voltages W1, W2, and W3 can be combined to create a result that more accurately reflects conditions of the pipe. For example, the combination can create a result with a reduced background noise (e.g., static magnetic field that is a result of the probe moving through the pipe while the voltages are being measured).

In some embodiments, a first combination value C1 and second combination value C2 are calculated based on Equations 9 and 10:

$$C1 = W2 + W3 - W1 \quad (9)$$

$$C2 = W1 + W2 + W3 \quad (10)$$

A reduced-error measurement R1 can then be calculated based on Equations 11 and 12:

$$R1 = C2 - C1 \quad (11)$$

$$R1 = (W1 + W2 + W3) - (W2 + W3 - W1) = 2W1 \quad (12)$$

As shown, the effects of the outer shaped coils are reflected in W2 and W3 and these values are being removed in this operation.

More information can be acquired by shifting the log obtained from W2 by half of the total length of the coil and the log obtained from W3 by half of the total length in the opposite direction, and then the combining both logs into a combined log value. A comparison between this combined log value with the log of W1 should be substantially equal in a low-noise environment. The differences between the two values can be correlated with the noise level as influenced by the static magnetic field present during measurement. The differences can be used as a quality indicator of the environment and can determine whether to rely on measurements from cylindrical coil receivers or from shaped coil receivers (as further described below).

Another combination can be obtained by observing the value C2. This value should be substantially proportional to the measurement obtained from a single cylindrical coil with a length and radius equal to the length and maximum radius of the lower shaped coil 404.

In other embodiments, measurements can be taken by a single multiplex device that is electrically connected to each of the shaped coils, or can instead provide other readings that can be converted into an understanding of the electrical energy transmitted to the receiver such as current or voltage. Regardless of specific arrangement, however, electric information from each of the separate coils can be isolated or combined for later analysis.

Figure 5:
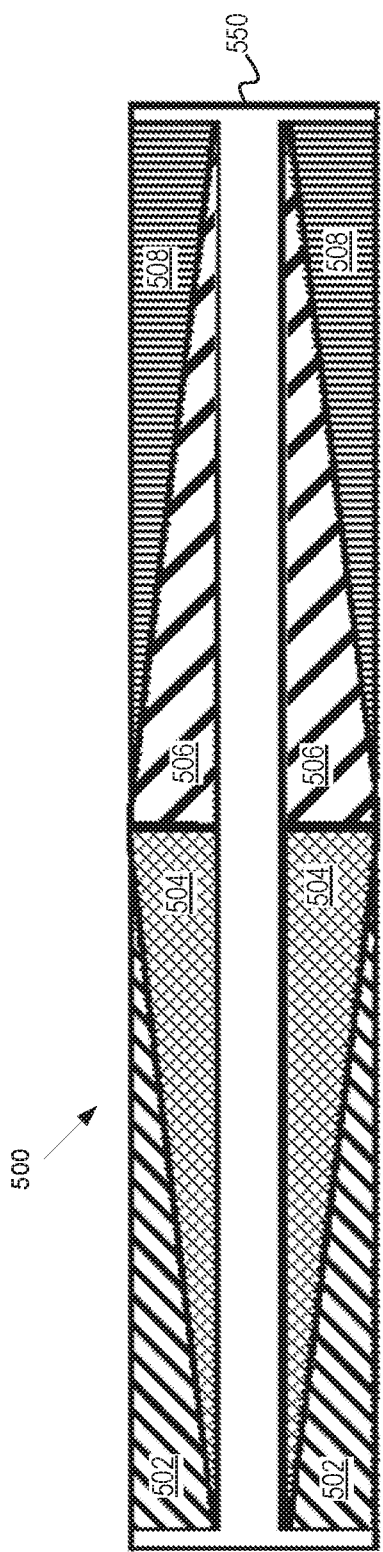
FIG. 5 depicts an example probe having four shaped coils, according to some embodiments.

FIG. 5 depicts an example probe having four shaped coils, according to some embodiments. FIG. 5 depicts a cross-sectional diagram of a probe 500 including four shaped coils.

A left lower shaped coil 504 winds around a cylindrical bobbin 550 starting at the left edge of the cylindrical bobbin 550 to the axial center of the cylindrical bobbin 550. The number of turns of the left lower shaped coil 504 linearly increases from 1 turn to N turns from the left edge of the cylindrical bobbin 550 to the axial center of the cylindrical bobbin 550. For example, the number of turns at the left edge of the cylindrical bobbin 550 of the left lower shaped coil 504 is 1, and the number of turns at the axial center of the cylindrical bobbin 550 is 999.

Adjacent to and coaxial with the lower shaped coil 504 is the right lower shaped coil 506. The number of turns of the right lower shaped coil 506 linearly decreases from N turns from the axial center of the cylindrical bobbin 550 to the right edge of the cylindrical bobbin 550. For example, the number of turns at the axial center of the cylindrical bobbin 550 of the right lower shaped coil 506 is 999, and the number of turns at the right edge of the cylindrical bobbin 550 is 1.

A left upper shaped coil 502 wraps around the left lower shaped coil 504 starting at the left edge of the cylindrical bobbin 550 and ending at the axial center of the cylindrical bobbin 550. In this example, the left upper shaped coil 502 wraps N turns around the left lower shaped coil 504 at the left edge of the cylindrical bobbin 550. The number of turns of the left upper shaped coil 502 can then linearly decrease as the coil is approaching the axial center of the cylindrical bobbin 550. For example, the number of turns at the left edge of the cylindrical bobbin 550 is 999, and the number of turns at the axial center of the cylindrical bobbin 550 is 1.

A right upper shaped coil 508 wraps around the right lower shaped coil 506 starting at the axial center of the cylindrical bobbin 550 and ending at the right edge of the cylindrical bobbin 550. In this example, the right upper shaped coil 508 wraps once around the left lower shaped coil 504 at the axial center of the cylindrical bobbin 550 and the number of turns of the right upper shaped coil 508 can then linearly increase as the coil is approaching the right edge of the cylindrical bobbin 550 until wrapping N turns around the right lower shaped coil 506. For example, the number of turns at the axial center of the cylindrical bobbin 550 is 1, and the number of turns at the right edge of the cylindrical bobbin 550 is 999.

Each shaped coil can measure a voltage (in response to a received signal) independent of any other coil. In this example, the left upper shaped coil 502 can measure a voltage W3. The lower shaped coil 504 can measure a voltage W1. The right upper shaped coil 508 can measure a voltage W4. The right lower shaped coil 506 can measure a voltage W2. The measured voltages W1, W2, W3, and W4 can be used to provide information on the state of the surrounding pipe. For example, with reference to FIG. 3, the induction device 302 can include the probe 500. The measured voltages W1, W2, W3, and W4 measured by shaped coils in the probe 500 can be used to determine various attributes (e.g., defects) in the pipe 304. Also, each of the coils 502, 504, 506, and 508 can measure a voltage either simultaneously or sequentially. The measured voltages W1, W2, W3, and W4 can be combined to either reduce noise or increase the total received signal. For example, the combination can create a result with a reduced background noise (e.g., noise resulting of the probe moving through the pipe surrounded by a static magnetic field while the voltages are being measured).

In some embodiments, a first combination value C1 and second combination value C2 are calculated based on Equations 13 and 14:

$$C1 = W3 + W4 - W1 - W2 \quad (13)$$

$$C2 = W1 + W2 + W3 + W4 \quad (14)$$

A reduced-error measurement R1 can then be calculated based on Equation 15 and 16:

$$R1 = C2 - C1 \quad (15)$$

$$R1 = (W3 + W4 + W1 - W2) - (W1 + W2 + W3 + W4) = 2(W3 + W4) \quad (16)$$

As shown, the effects of the outer shaped coils are reflected in W1 and W2 and these values are being removed in this operation. In some embodiments, another combination can be obtained by observing the value C2. This value should be substantially equal to the measurement obtained from a single traditional cylindrical coil with a length of the combined left lower shaped coil 504 and right lower shaped coil 506 and radius of the lower shaped coil 504.

In contrast to the example coils described above, FIGS. 6-8 depict example probes having multiple coils wherein at least one of the coils is a transmitter coil. Thus, in contrast to the probes 400 and 500, the probes depicted in FIGS. 6-8 include both transmitter and receiver coils. Additionally, in these example probes, channels are defined between a transmitter coil and a receiver coil. In the context of arrangements with an active transmitter, a channel is defined as a measurement made by one or more shaped coils acting as receivers based on a signal generated by one or more transmitters. In the context of arrangements without an active transmitter, a channel is defined as a measurement made by one or more shaped coils acting as receivers based on a static magnetic field.

Figure 6:
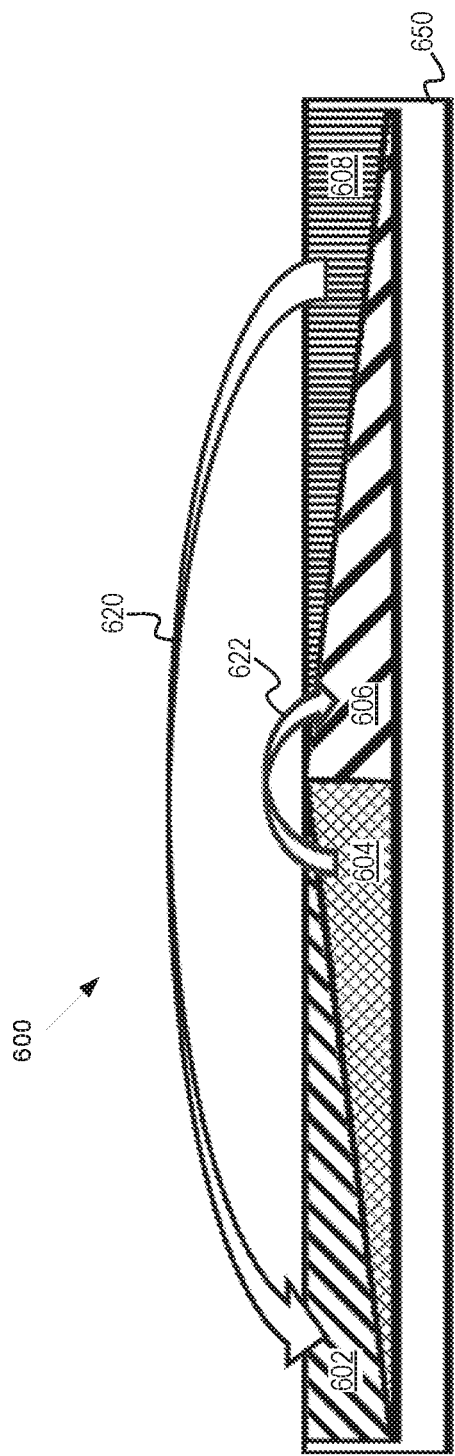
FIG. 6 depicts an example probe having four shaped coils, according to some embodiment.

FIG. 6 depicts an example probe having four shaped coils, according to some embodiment. FIG. 6 depicts a cross-sectional diagram of the upper half of a probe 600 including four shaped coils and example channels between the shaped coils.

A left lower shaped coil 604 acting as a transmitter winds around a cylindrical bobbin 650 starting at the left edge of the cylindrical bobbin 650 to the axial center of the cylindrical bobbin 650. The number of turns of the left lower shaped coil 604 linearly increases from 1 turn to N turns from the left edge of the cylindrical bobbin 650 to the axial center of the cylindrical bobbin 650. For example, the number of turns at the left edge of the cylindrical bobbin 650 of the left lower shaped coil 604 is 1, and the number of turns at the axial center of the cylindrical bobbin 650 is 999.

Adjacent to and coaxial with the lower shaped coil 604 is the right lower shaped coil 606 acting as a receiver. The number of turns of the right lower shaped coil 606 linearly decreases from N turns from the axial center of the cylindrical bobbin 650 to the right edge of the cylindrical bobbin 650. For example, the number of turns at the axial center of the cylindrical bobbin 650 of the right lower shaped coil 606 is 999, and the number of turns at the right edge of the cylindrical bobbin 650 is 1.

A left upper shaped coil 602 acting as a receiver wraps around the left lower shaped coil 604 starting at the left edge of the cylindrical bobbin 650 and ending at the axial center of the cylindrical bobbin 650. In this example, the left upper shaped coil 602 wraps N turns around the left lower shaped coil 504 at the left edge of the cylindrical bobbin 650. The number of turns of the left upper shaped coil 602 can then linearly decrease as the coil is approaching the axial center of the cylindrical bobbin 650. For example, the number of turns at the left edge of the cylindrical bobbin 650 of the left upper shaped coil 602 is 999, and the number of turns at the axial center of the cylindrical bobbin 650 is 1.

A right upper shaped coil 608 acting as a transmitter wraps around the right lower shaped coil 606 starting at the axial center of the cylindrical bobbin 650 and ending at the right edge of the cylindrical bobbin 650. In this example, the right upper shaped coil 608 wraps once around the left lower shaped coil 604 at the axial center of the cylindrical bobbin 650 and the number of turns of the right upper shaped coil 608 can then linearly increase as the coil is approaching the right edge of the cylindrical bobbin 650 until wrapping N turns around the right lower shaped coil 606. For example, the number of turns at the axial center of the cylindrical bobbin 650 is 1, and the number of turns at the right edge of the cylindrical bobbin 650 is 999.

A number of channels defined by a signal transmitted by a transmitter coil and detected by a receiver coil are also depicted in FIG. 6. For example, a first channel 620 is defined by a signal transmitted by the right upper shaped coil 608 and detected by the left upper shaped coil 602. A second channel 622 is defined by a signal transmitted by the left lower shaped coil 604 and detected by the right lower shaped coil 606. The channels can be measured individually or simultaneously. In some embodiments, a channel can include the combination of the first channel 620 and the second channel 622. A measurement cycle can run through one or more modes of operation either simultaneously or in sequence, and the signals acquired from these measurement cycles can be used to develop a signal profile to help identify baseline measurements or perturbations in the material surrounding the multi-coil probe. For example, in some embodiments, both the first channel 620 and the second channel 622 can be created simultaneously as the probe 600 is lowered into the well.

Figure 7:
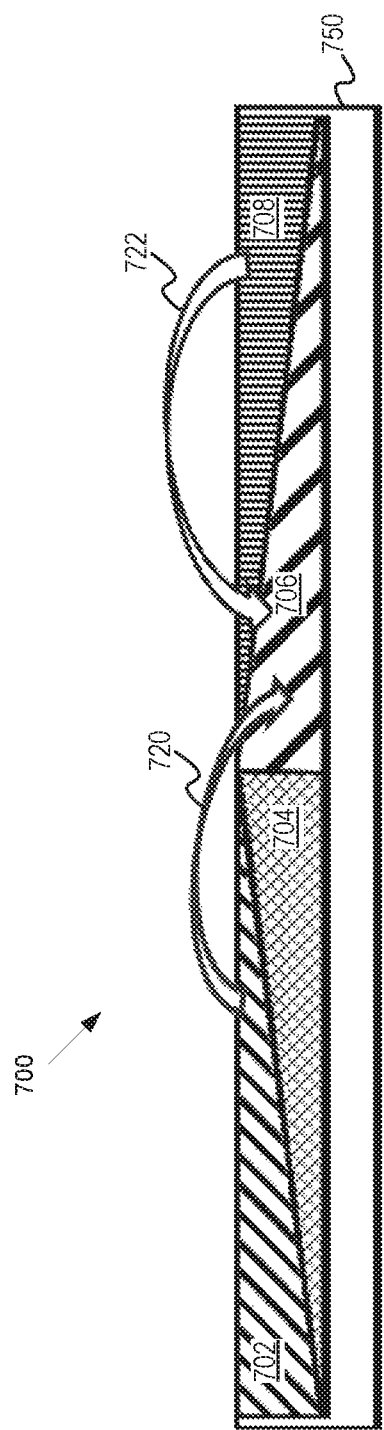
FIG. 7 depicts an example probe having four shaped coils, according to some embodiments.

FIG. 7 depicts an example probe having four shaped coils, according to some embodiments. FIG. 7 depicts a cross-sectional diagram of the upper half of a probe 700 including four shaped coils.

A left lower shaped coil 704 winds around a cylindrical bobbin 750 starting at the left edge of the cylindrical bobbin 750 to the axial center of the cylindrical bobbin 750. The number of turns of the left lower shaped coil 704 linearly increases from 1 turn to N turns from the left edge of the cylindrical bobbin 750 to the axial center of the cylindrical bobbin 750. For example, the number of turns at the left edge of the cylindrical bobbin 750 of the left lower shaped coil 704 is 1, and the number of turns at the axial center of the cylindrical bobbin 750 is 999.

A right lower shaped coil 706 acting as a receiver is adjacent to and coaxial with the lower shaped coil 704. The number of turns of the right lower shaped coil 706 linearly decreases from N turns from the axial center of the cylindrical bobbin 750 to the right edge of the cylindrical bobbin 750. For example, the number of turns at the axial center of the cylindrical bobbin 750 of the right lower shaped coil 706 is 999, and the number of turns at the right edge of the cylindrical bobbin 750 is 1.

A left upper shaped coil 702 acting as a transmitter wraps around the left lower shaped coil 704 starting at the left edge of the cylindrical bobbin 750 and ending at the axial center of the cylindrical bobbin 750. In this example, the left upper shaped coil 702 wraps N turns around the left lower shaped coil 504 at the left edge of the cylindrical bobbin 750. The number of turns of the left upper shaped coil 702 can then linearly decrease as the coil is approaching the axial center of the cylindrical bobbin 750. For example, the number of turns at the left edge of the cylindrical bobbin 750 of the left upper shaped coil 702 is 999, and the number of turns at the axial center of the cylindrical bobbin 750 is 1.

A right upper shaped coil 708 acting as a transmitter wraps around the right lower shaped coil 706 starting at the axial center of the cylindrical bobbin 750 and ending at the right edge of the cylindrical bobbin 750. In this example, the right upper shaped coil 708 wraps once around the left lower shaped coil 704 at the axial center of the cylindrical bobbin 750 and the number of turns of the right upper shaped coil 708 can then linearly increase as the coil is approaching the right edge of the cylindrical bobbin 750 until wrapping N turns around the right lower shaped coil 706. For example, the number of turns at the axial center of the cylindrical bobbin 750 is 1, and the number of turns at the right edge of the cylindrical bobbin 750 is 999.

In some embodiments, a channel 720 is defined by a signal transmitted by the left upper shaped coil 702 and detected by the right lower shaped coil 706. In some embodiments, a channel 722 is defined by a signal transmitted by the right upper shaped coil 708 and detected by the right lower shaped coil 706.

Figure 8:
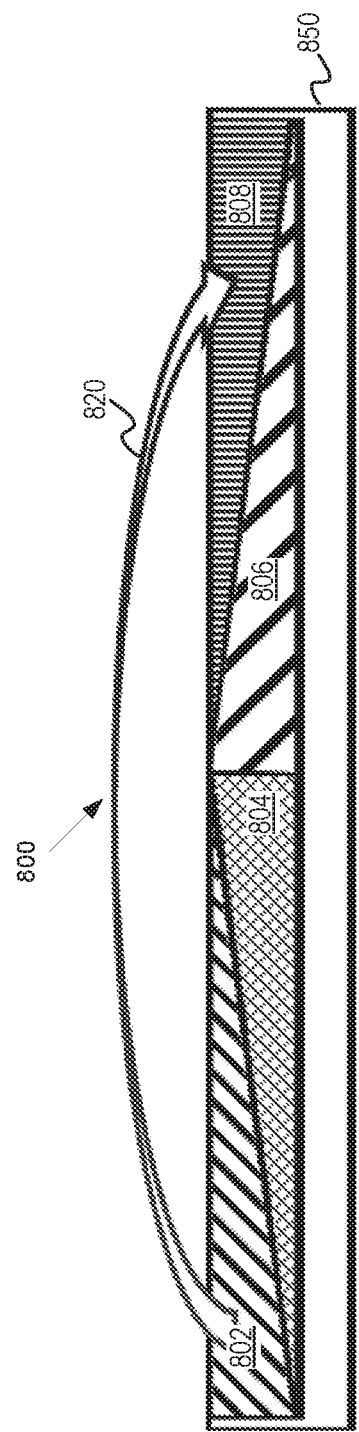
FIG. 8 depicts an example probe having four shaped coils, according to some embodiments.

FIG. 8 depicts an example probe having four shaped coils, according to some embodiments. FIG. 8 depicts a cross-sectional diagram of the upper half of a probe 800 included of four shaped coils.

A left lower shaped coil 804 winds around a cylindrical bobbin 850 starting at the left edge of the cylindrical bobbin 850 to the axial center of the cylindrical bobbin 850. The number of turns of the left lower shaped coil 804 linearly increases from 1 turn to N turns from the left edge of the cylindrical bobbin 850 to the axial center of the cylindrical bobbin 850. For example, the number of turns at the left edge of the cylindrical bobbin 850 of the left lower shaped coil 804 is 1, and the number of turns at the axial center of the cylindrical bobbin 850 is 999.

A right lower shaped coil 806 is adjacent to and coaxial with the lower shaped coil 804. The number of turns of the right lower shaped coil 806 linearly decreases from N turns from the axial center of the cylindrical bobbin 850 to the right edge of the cylindrical bobbin 850. For example, the number of turns at the axial center of the cylindrical bobbin 850 of the right lower shaped coil 806 is 999, and the number of turns at the right edge of the cylindrical bobbin 850 is 1.

A left upper shaped coil 802 acting as a transmitter wraps around the left lower shaped coil 804 starting at the left edge of the cylindrical bobbin 850 and ending at the axial center of the cylindrical bobbin 850. In this example, the left upper shaped coil 802 wraps N turns around the left lower shaped coil 504 at the left edge of the cylindrical bobbin 850. The number of turns of the left upper shaped coil 802 can then linearly decrease as the coil is approaching the axial center of the cylindrical bobbin 850. For example, the number of turns at the left edge of the cylindrical bobbin 850 of the left upper shaped coil 802 is 999, and the number of turns at the axial center of the cylindrical bobbin 850 is 1.

A right upper shaped coil 808 acting as a receiver wraps around the right lower shaped coil 806 starting at the axial center of the cylindrical bobbin 850 and ending at the right edge of the cylindrical bobbin 850. In this example, the right upper shaped coil 808 wraps once around the left lower shaped coil 804 at the axial center of the cylindrical bobbin 850 and the number of turns of the right upper shaped coil 808 can then linearly increase as the coil is approaching the right edge of the cylindrical bobbin 850 until wrapping N turns around the right lower shaped coil 806. For example, the number of turns at the axial center of the cylindrical bobbin 850 is 1, and the number of turns at the right edge of the cylindrical bobbin 850 is 999. In some embodiments, a channel 820 is defined by a signal transmitted by the left upper shaped coil 802 and being detected by the right upper shaped coil 808.

Figure 9:
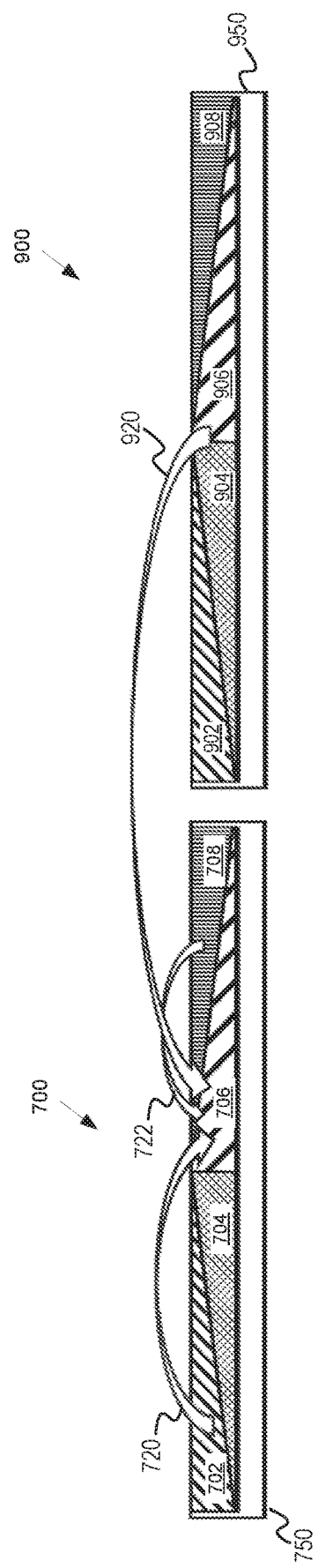
FIG. 9 depicts two example shaped coil probes, according to some embodiments.

FIG. 9 depicts two example shaped coil probes, according to some embodiments. FIG. 9 depicts a cross-sectional diagram of the upper half of the probe 700, a multi-coil probe 900 having four shaped coils and a set of channels. The channels 720 and 722 are defined by the signals transmitted by the left upper shaped coil 702 and the right upper shaped coil 708 and detected by the right lower shaped coil 706. A channel 920 is defined by the combined signal transmitted by the left lower shaped coil 904 and the right lower shaped coil 906 and detected by the right lower shaped coil 706.

A left lower shaped coil 904 acting as a transmitter winds around a cylindrical bobbin 950 starting at the left edge of the cylindrical bobbin 950 to the right edge of the cylindrical bobbin 950. The number of turns of the left lower shaped coil 904 linearly increases from 1 turn to N turns from the left edge of the cylindrical bobbin 950 to the axial center of the cylindrical bobbin 950. For example, the number of turns at the left edge of the cylindrical bobbin 650 of the left lower shaped coil 604 is 1, and the number of turns at the axial center of the cylindrical bobbin 650 is 999.

A right lower shaped coil 906 acting as a transmitter is adjacent to and coaxial with the left lower shaped coil 904. The number of turns of the right lower shaped coil 906 linearly decreases from N turns from the axial center of the cylindrical bobbin 950 to the right edge of the cylindrical bobbin 950. For example, the number of turns at the axial center of the cylindrical bobbin 950 of the right lower shaped coil 906 is 999, and the number of turns at the right edge of the cylindrical bobbin 950 is 1.

A left upper shaped coil 902 wraps around the left lower shaped coil 904 starting at the left edge of the cylindrical bobbin 950 and ending at the axial center of the cylindrical bobbin 950. In this example, the left upper shaped coil 902 wraps N turns around the left lower shaped coil 504 at the left edge of the cylindrical bobbin 950. The number of turns of the left upper shaped coil 902 can then linearly decrease as the coil is approaching the axial center of the cylindrical bobbin 950. For example, the number of turns at the left edge of the cylindrical bobbin 950 of the left upper shaped coil 902 is 999, and the number of turns at the axial center of the cylindrical bobbin 950 is 1.

A right upper shaped coil 908 wraps around the right lower shaped coil 806 starting at the axial center of the cylindrical bobbin 950 and ending at the right edge of the cylindrical bobbin 950. In this example, the right upper shaped coil 908 wraps once around the left lower shaped coil 904 at the axial center of the cylindrical bobbin 950 and the number of turns of the right upper shaped coil 908 can then linearly increase as the coil is approaching the right edge of the cylindrical bobbin 950 until wrapping N turns around the right lower shaped coil 906. For example, the number of turns at the axial center of the cylindrical bobbin 950 is 1, and the number of turns at the right edge of the cylindrical bobbin 950 is 999.

In some embodiments, the combined signals acquired by the right lower shaped coil 706 and transmitted by both the left lower shaped coil 904 and the right lower shaped coil 906 can be used to measure the channel 920. Also depicted are the channels 720 and 722. In cases where distance-dependent noise sources such as a magnetic anomaly or formation artifact are present, the measurements most appropriate for a situation can be used to minimize these distance-dependent noise sources. For example, if the measured effect is greater than a pre-set magnetic anomaly threshold, data processing can focus on the information from channels 720 and 722 instead of channel 920 because the effective distance for the channels 720 and 722 are far greater than the effective distance for the channel 920, wherein an effective distance is defined as the distance between the center of a transmitter to the center of a receiver in the case of a single transmitter, or the distance between the center of a plurality of transmitters to the center of a receiver in the case of a plurality of transmitters.

In some embodiments, the shaped coils acting as transmitters (e.g. the left upper shaped coil 702, the left lower shaped coil 904, the right lower shaped coil 906, and the left upper shaped coil 708) can be selectively activated or deactivated to build a profile of multiple channels. The profile can be used to understand how distinct physical changes in the materials surrounding a well tool including the probe 700 and the multi-coil probe 900 can respond differently and help identify features or parameters of any pipe surrounding the shaped coil probes.

Figure 10:
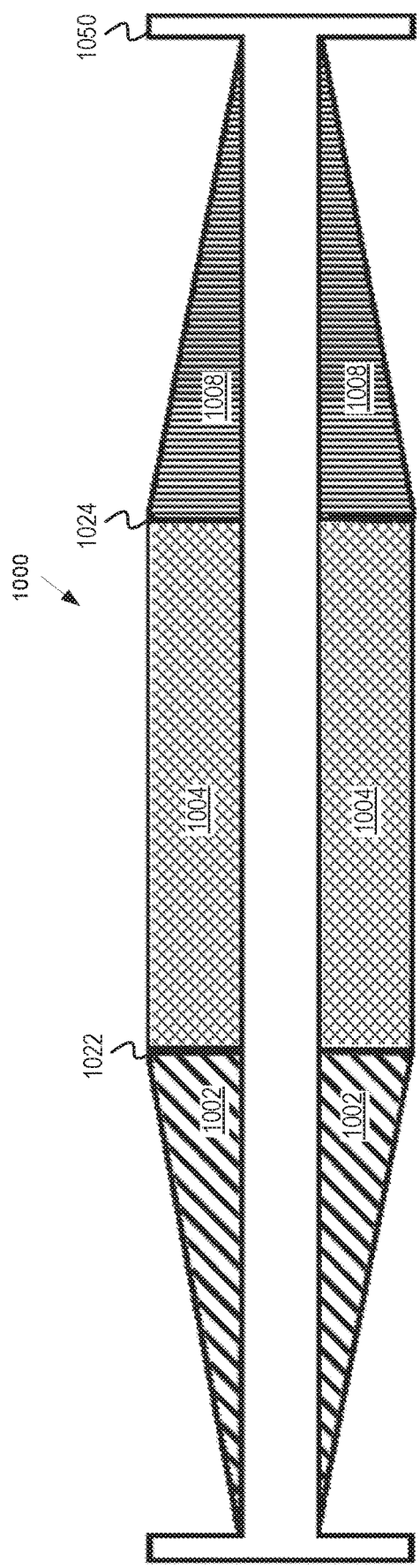
FIG. 10 depicts an example probe having two shaped coils and one cylindrical coil wrapped around a cylindrical bobbin, according to some embodiments.

In contrast to the example coils described above, FIGS. 10-11 depict example probes having multiple coils wherein one of the coils is a non-shaped or cylindrical coil and the remaining coils are shaped coils. FIG. 10 depicts an example probe having two shaped coils and one cylindrical coil wrapped around a cylindrical bobbin, according to some embodiments. FIG. 10 depicts a cross-sectional diagram of a probe 1000 including three coils.

A left shaped coil 1002 winds around a cylindrical bobbin 1050 starting at the left edge of the cylindrical bobbin 1050 to a first axial point 1022 of the cylindrical bobbin 1050. The number of turns of the left shaped coil 1002 linearly increases from 1 turn to N turns from the left edge of the cylindrical bobbin 1050 to the first axial point 1022 of the cylindrical bobbin 1050. For example, the number of turns at the left edge of the cylindrical bobbin 1050 is 1, and the number of turns at the first axial point 1022 of the cylindrical bobbin 1050 is 999.

A center cylindrical coil 1004 winds around a cylindrical bobbin 1050 starting at the first axial point 1022 of the cylindrical bobbin 1050 to a second axial point 1024 of the cylindrical bobbin 1050. The number of turns of the center cylindrical coil 1004 remains constant at N turns from the first axial point of the cylindrical bobbin 1050 to the second axial point 1024 of the cylindrical bobbin 1050. For example, the number of turns in the center cylindrical coil 1004 remains constant at 999.

A right shaped coil 1008 wraps around a cylindrical bobbin 1050 starting at the second axial point 1024 of the cylindrical bobbin 1050 and ending at the right edge of the cylindrical bobbin 1050. In this example, the right shaped coil 1008 wraps N turns at the second axial point 1024 of the cylindrical bobbin 1050 and the number of turns of the right shaped coil 1008 can then linearly decrease as the coil is approaching the right edge of the cylindrical bobbin 1050 until wrapping N turns around the cylindrical bobbin 1050. For example, the number of turns at the second axial point 1024 of the cylindrical bobbin 1050 is 999, and the number of turns at the right edge of the cylindrical bobbin 1050 is 1.

The coils depicted in FIG. 10 are not wound on top of each other, and the center cylindrical coil 1004 is not a shaped coil. In one example, an operation can use this assembly by first determining whether a shaped coil measurement or cylindrical coil measurement is to be selected for data processing and numerical inversion, based on the static magnetic field. In the case that a shaped coil measurement is to be used, the channels made by the left shaped coil 1002 and right shaped coil 1008 are used. In the case that a cylindrical measurement can be selected, the channel made by the center cylindrical coil 1004 can be selected. In some embodiments, non-overlapping coil arrangements such as the one depicted in FIG. 10 can avoid artifacts resulting from overlapping shaped coils.

Figure 11:
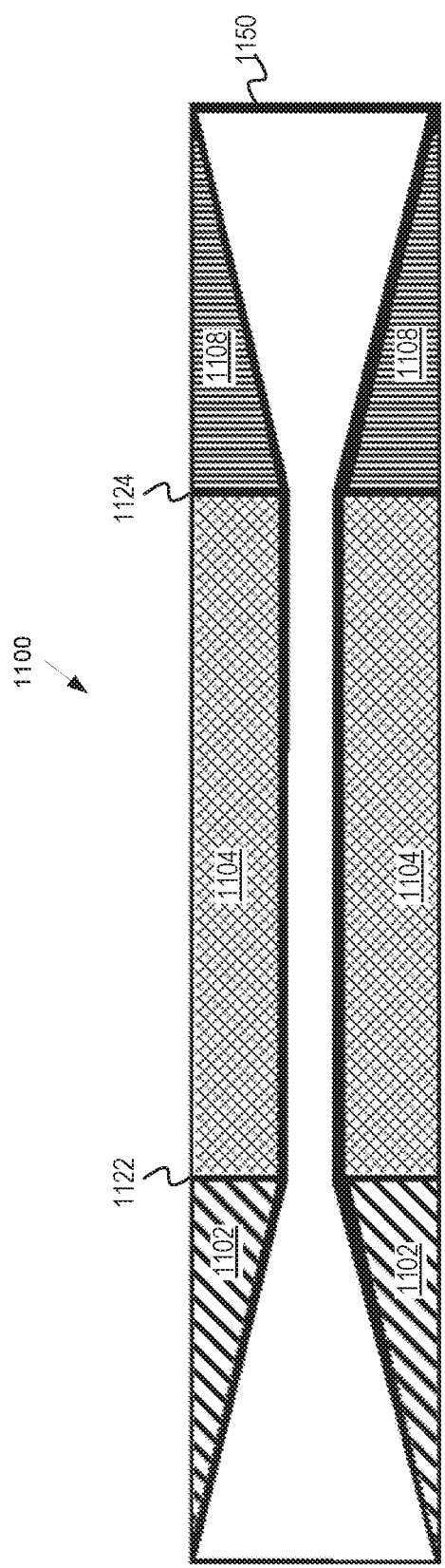
FIG. 11 depicts an example probe having two shaped coils and one cylindrical coil, wrapped around a non-cylindrical bobbin, according to some embodiments.

FIG. 11 depicts an example probe having two shaped coils and one cylindrical coil, wrapped around a non-cylindrical bobbin, according to some embodiments. FIG. 11 depicts a cross-sectional diagram of a probe 1100 including three coils wrapped around a shaped bobbin 1150.

In some embodiments, the shaped bobbin 1150 is one in which the radius of the bobbin is non-uniform. In some embodiments, the shaped bobbin 1150 can have a narrower central neck than at either end of the bobbin. The shaped bobbin 1150 can decrease in diameter from its left edge to a first axial point 1122. The shaped bobbin 1150 can increase in diameter from a second axial point 1124 to its right edge.

A left shaped coil 1102 winds around the shaped bobbin 1150 starting at the left edge of the shaped bobbin 1150 to the first axial point 1122 of the shaped bobbin 1150. The number of turns of the left shaped coil 1102 linearly increases from 1 turn to N turns from the left edge of the shaped bobbin 1150 to the first axial point 1122 of the shaped bobbin 1150. In some embodiments, the number of turns increases at a rate such that each outer turn of the left shaped coil 1102 has the same radius. For example, the number of turns at the left edge of the shaped bobbin 1150 is 1, and the number of turns at the first axial point 1122 of the shaped bobbin 1150 is 999.

A center cylindrical coil 1104 winds around the shaped bobbin 1150 starting at the first axial point 1122 to the second axial point 1124. The number of turns of the center cylindrical coil 1104 remains constant at N turns from the first axial point 1122 to the second axial point 1124. For example, the number of turns in the center cylindrical coil 1104 remains constant at 999.

A right shaped coil 1108 wraps around the shaped bobbin 1150 starting at the second axial point 1124 of the shaped bobbin 1150 and ending at the right edge of the shaped bobbin 1150. In this example, the right shaped coil 1108 wraps N turns at the second axial point 1124 of the shaped bobbin 1150 and the number of turns of the right shaped coil 1108 can then linearly decrease as the coil is approaching the right edge of the shaped bobbin 1150 until wrapping N turns around the shaped bobbin 1150. In some embodiments, the number of turns decreases at a rate such that each outer turn of the left shaped coil 1108 has the same radius. For example, the number of turns at the second axial point 1124 of the shaped bobbin 1150 is 999, and the number of turns at the right edge of the shaped bobbin 1150 is 1.

In contrast to conventional probes, a probe having coils wrapped around a shaped bobbin (as described herein) includes coils that can have a macroscopically cylindrical body while still maintaining the noise-reducing features of shaped coils. Additionally, winding machines can easily be adapted to create cylindrical shaped receiver coils with bobbins of non-uniform circumference.

While not illustrated, other assemblies of bobbins and multi-coil probes can include asymmetrical receiver coils, where one end of the receiver coil has a circumference distinct from the other end of the receiver coil. In some embodiments, a multi-shaped coil probe can include parabolically shaped bobbins, where the radius of the bobbin is configured to increase quadratically along the longitudinal axis to an axial center, then decrease quadratically along the longitudinal axis to the other end of the bobbin. Some embodiments of shaped coils can also incorporate a step function design, where the turn density changes in a step function instead of linearly. Such step coil assemblies can be asymmetrical or symmetrical, and can also be mixed with the gradual turn density changes described above.

Example Operations

Figure 12:
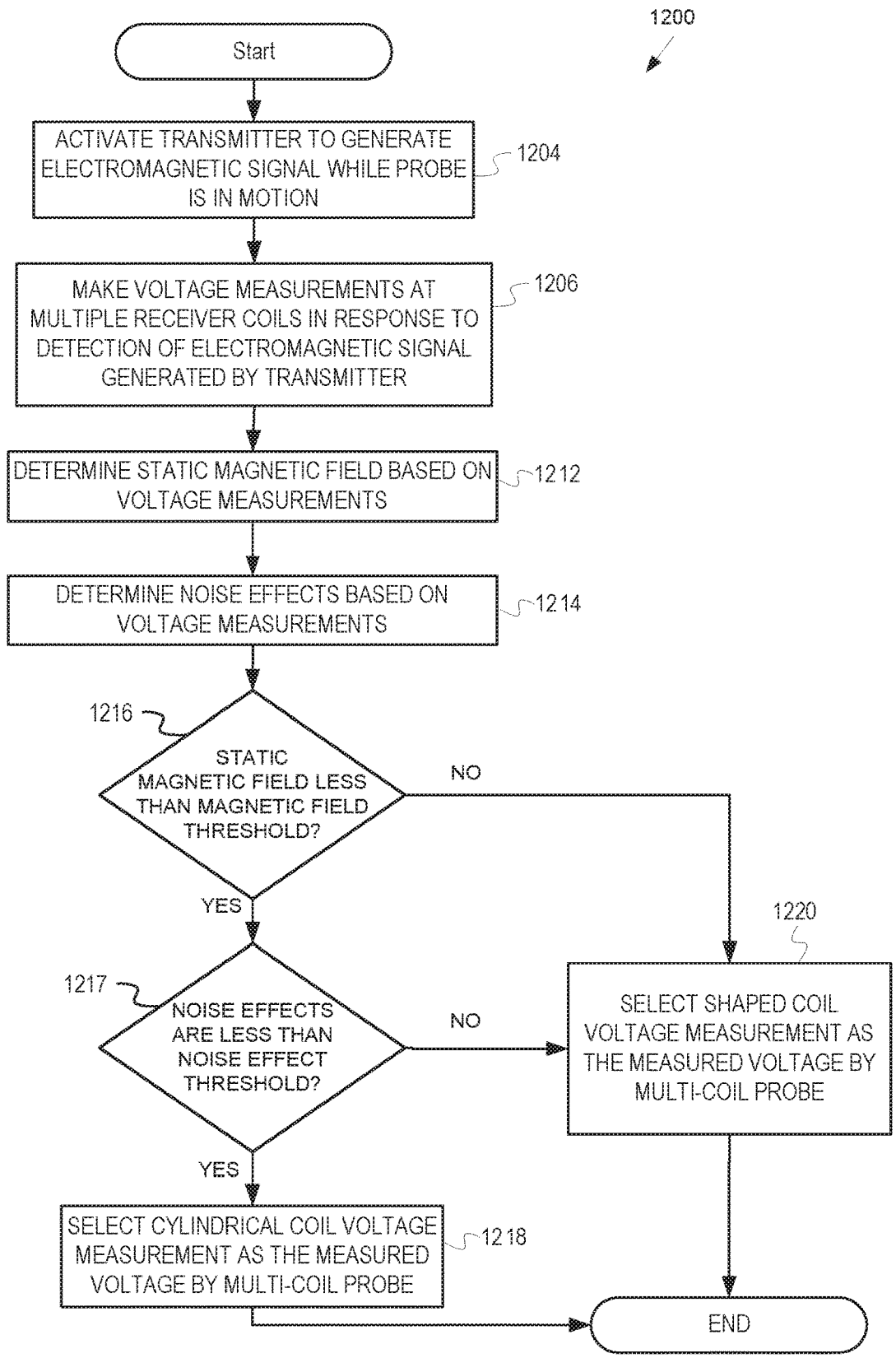
FIG. 12 depicts a flowchart of operations for determining parameters of a pipe casing in a wellbore using multiple coils, according to some embodiments.

FIG. 12 depicts a flowchart of operations for determining parameters of a pipe casing in a wellbore using multiple coils, according to some embodiments. Operations of a flowchart 1200 of FIG. 12 can be performed by software, firmware, hardware or a combination thereof. For example, with reference to FIG. 3, a processor in a computer device located at the surface can execute instructions to perform operations of the flowchart 1200. Additionally, operations of the flowchart 1200 can use any of the multiple coil configurations depicted in FIGS. 4-11. Operations of the flowchart 1200 are described with further reference to FIGS. 3-4. Operations of the flowchart 1200 begin at block 1204.

At block 1204, a transmitter is activated to generate an electromagnetic signal (e.g., a magnetic field) while the probe is in motion. For example, with reference to FIG. 3, a transmitter in the induction logging device 302 can be activated while being lowered down the wellbore 304. Thus, the transmitter can be integrated with the probe or tool that includes the shaped receiver coils (described above) that are to detect the magnetic field after its traversal through the pipe 320. In some other embodiments, the transmitter can be in a separate probe or tool.

At block 1206, voltage measurements are made at multiple receiver coils in response to detection of the electromagnetic signal generated by the transmitter. As depicted in FIGS. 4-11, the receiver coils can be different combinations of shaped and cylindrical coils in one or more probes. For example, each of the receiver coils can be shaped coils (with no cylindrical coils) on a same probe—see examples depicted in FIGS. 4-8. In another example, the receiver coils can be on multiple probes—see example depicted in FIG. 9. In another example, the receiver coils can include both shaped and cylindrical coils—see examples depicted in FIGS. 10-11. Each of the receiver coils can make a voltage measurement. For example, with reference to FIG. 4, the lower shaped coil 404, left upper shaped coil 402, and right upper shaped coil 408 can make voltage measurements W1, W2, and W3, respectively. In some embodiments, these measurements may be made at least partially in parallel. In some embodiments, these measurements can be made while the transmitter is generating the electromagnetic signal.

At block 1212, a static magnetic field is determined based on voltage measurements made (independent of signal from excitation of transmitter). In some embodiments, the static magnetic field can be determined directly from the voltage measurements of a probe when no transmitter is active. In other words, the static magnetic field is not based on a signal generated by a transmitter. For example, with reference to FIG. 3, the static magnetic field may be a result of magnetization in the pipe, abnormalities in the surrounding formation, unpredicted magnetic effects from fluids, or side effects of other measuring equipment in the pipe 320. In some embodiments, known baseline values can be used to compare with voltage measurements to determine a static magnetic field. For example, with respect to FIG. 4, the measured voltages W1, W2, and W3 can be significantly greater than known standard voltage values when the receiver coils are moving through the static magnetic field.

At block 1214, noise effects are determined based on voltage measurements made (independent of signal from excitation of transmitter). In some embodiments, the noise effects can be determined directly from the voltage measurements of a probe when no transmitter is active. In other words, the noise effects not based on a signal generated by a transmitter. For example, a magnetic anomaly can be determined based on the static magnetic field and the voltage measurement channels W1, W2, and W3. In some examples, with reference to FIG. 3, the magnetic anomaly may be a result of abnormalities in the surrounding pipes, unpredicted magnetic effects from fluids, or side effects of other measuring equipment in the pipe 320. In some embodiments, known baseline values can be used to compare with magnetic anomaly measurements to determine the presence of a magnetic anomaly.

At block 1216, a determination is made of whether the static magnetic field is less than a magnetic field threshold. The value of the magnetic field threshold can be based on various factors such how fast the probe is moving through the wellbore. Other factors can include types of pipes being traversed down the wellbore, composition of the pipe, thickness of the pipe, ambient pressure and temperature in the wellbore, and types of pipe collar, etc. For example, with respect to FIG. 2, a multi-coil probe can move through a pipe with a static magnetic field and measure the voltages shown in plot 230. At a depth of 4 feet (ft), the voltage measured by a cylindrical coil without an active transmitter is 3 volts as a result of the static magnetic field B(4 ft). The value of B(4 ft) can be determined based on the voltage and the speed that the probe is traveling through the pipe. If the B(4 ft) is greater than a magnetic field threshold, then the static magnetic field would be determined to be greater than the magnetic field threshold. If the static magnetic field is less than the magnetic field threshold, operations of the flowchart 1200 continue at block 1217. If the static magnetic field is not less than the magnetic field threshold, the operation will proceed to use shaped coil measurements at block 1220.

At block 1217, a determination is made of whether noise effects are less than a noise effect threshold. The value of the noise effect threshold can be based on various factors such how fast the probe is moving through the wellbore. Other factors can include type of pipes being traversed down the wellbore, composition of the pipes, thickness of the pipes, ambient pressure and temperature in the wellbore, and types of pipe collar etc. If the magnitude of any other noise effects is less than a noise effect threshold, the operation proceeds to block 1218. In some embodiments, a noise effect can be calculated as a magnetic anomaly. If the magnitude of some other noise effect is not less than a noise effect threshold, the operation will proceed to use shaped coil measurements at block 1220.

At block 1218, a cylindrical coil voltage measurement is selected as the measured voltage by the multi-coil probe. In particular, when a static magnetic field or other noise effects are low enough to be ignored, a voltage measurement from a cylindrical coil can have the highest raw measurement values relative to the axial length occupied by the receiver coils. A cylindrical coil voltage measurement can be acquired from the measurements of shaped coils that are combined to form a cylindrical coil, or from an actual cylindrical coil. For example, with respect to FIG. 4, the voltage measurement from each of the coils 402, 404, and 408 can be combined to form cylindrical coil voltage measurement by adding the measured voltage values (i.e. W1+W2+W3). Operations of the flowchart 1200 are complete.

At block 1220, a shaped coil voltage measurement is selected as the measured voltage by the multi-coil probe. In particular, when a static magnetic field or other noise effects are too great to be ignored, a voltage measurement from one or more shaped coils can be more appropriate than a voltage measurement from a cylindrical coil, wherein the shaped coils are designed to reduce the voltage generated by moving a coil through a static magnetic field. For example, with reference to the multi-coil probe depicted in FIG. 4, the value of R1 in Equation 10 at different depths in the pipe can be used to determine pipe parameters. R1 can provide an appropriate reduced-noise measurement of coil voltage because the voltages of the left upper shaped coil 402 and the right upper shaped coil 408 are subtracted, leaving the voltage measurement provided by the lower shaped coil 404. Operations of the flowchart 1200 are complete.

Figure 13:
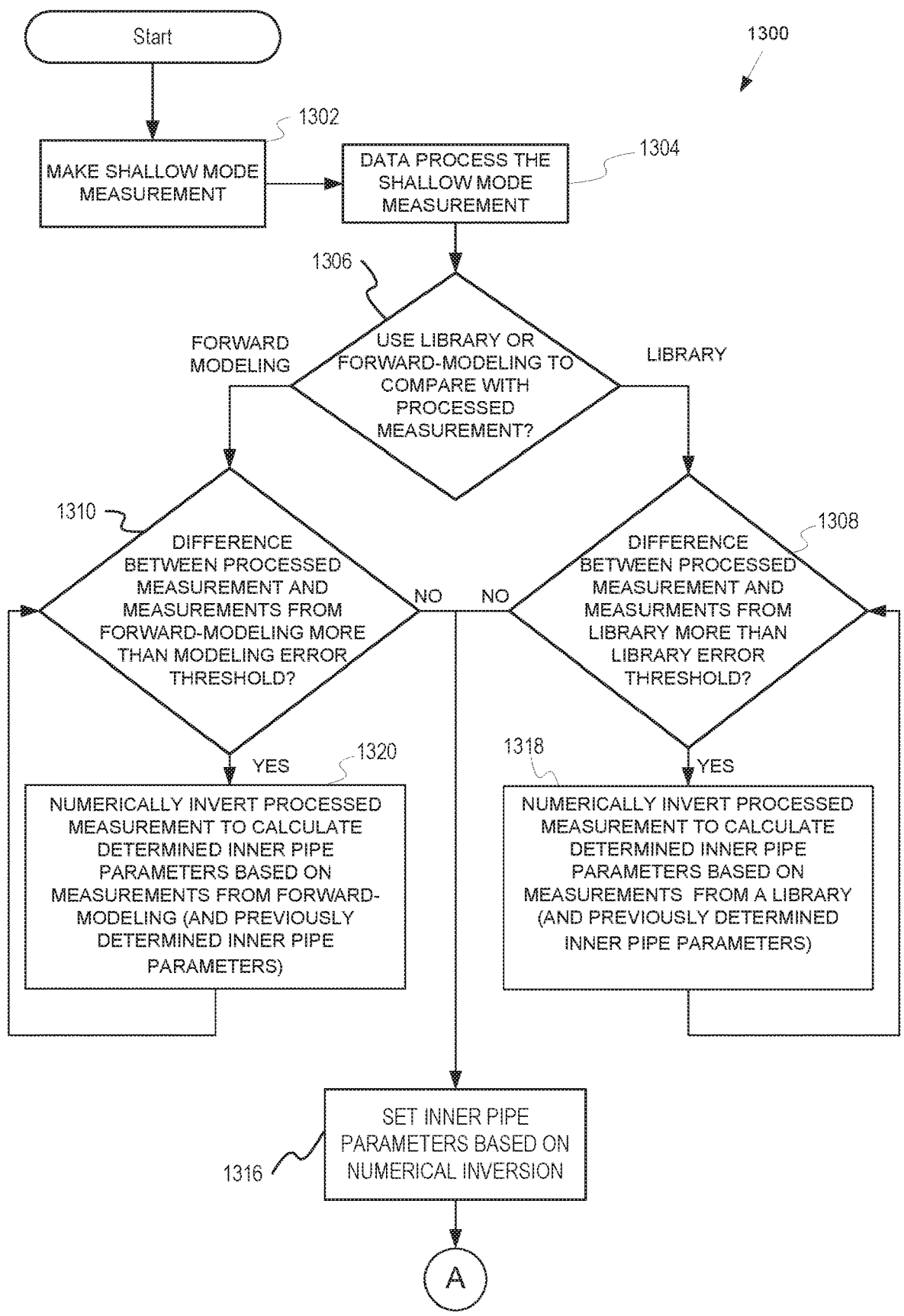
FIGS. 13-14 depict a flowchart of operations for using shaped coils to determine both shallow and deep pipe parameters, according to some embodiments.
Figure 14:
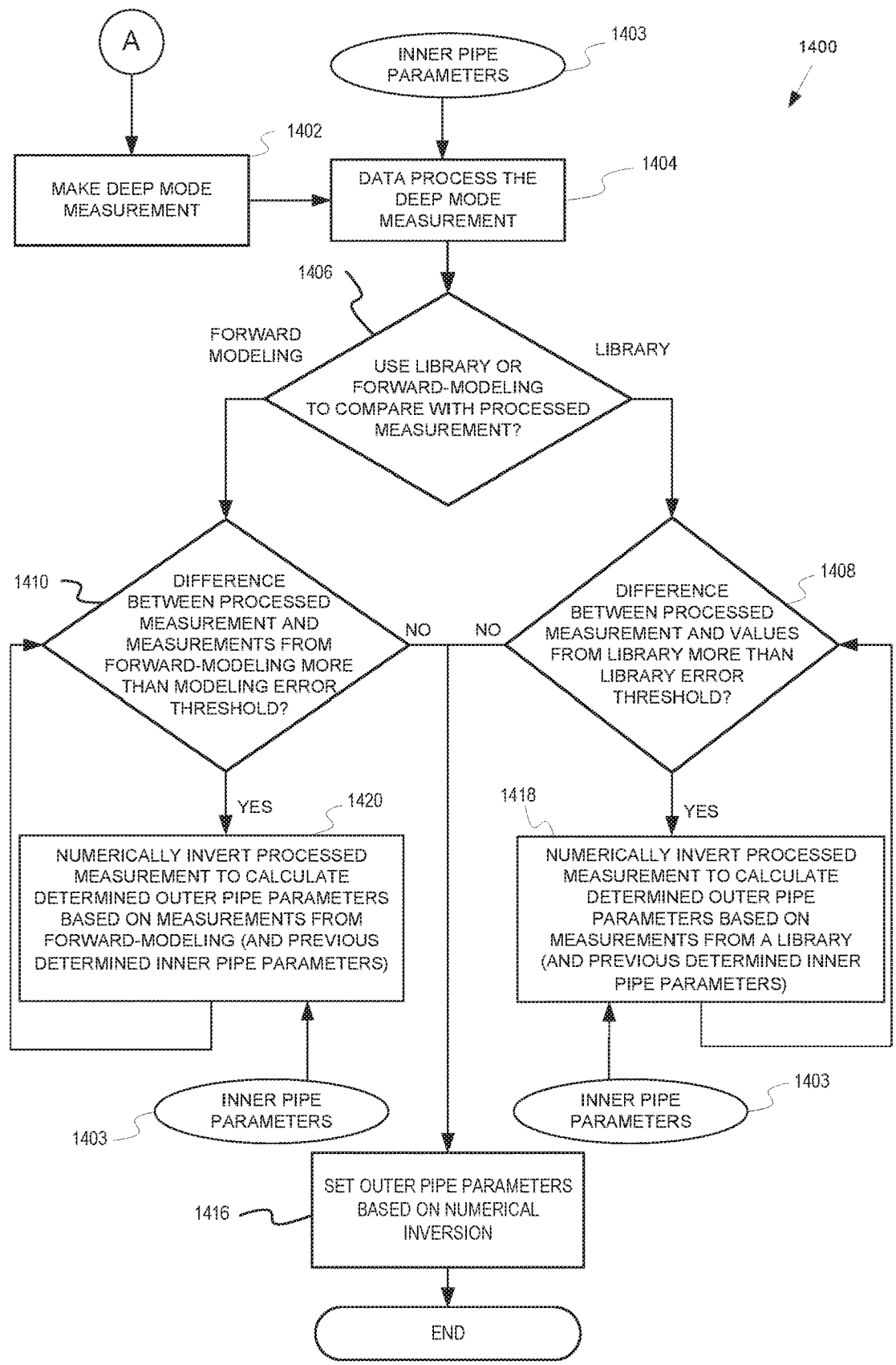

FIGS. 13-14 depict a flowchart of operations for using shaped coils to determine both shallow and deep pipe parameters, according to some embodiments. Operations of a flowchart 1300 of FIG. 13 continue in operations of a flowchart 1400 of FIG. 14 through a transition point A. Operations of the flowcharts 1300-1400 can be performed by software, firmware, hardware or a combination thereof. For example, with reference to FIG. 3, a processor in a computer device located at the surface can execute instructions to perform operations of the flowcharts 1300-1400. Additionally, operations of the flowcharts 1300-1400 can use any of the multiple coil configurations depicted in FIGS. 4-11. Operations of the flowcharts 1300-1400 are described with further reference to FIGS. 3-4 and 7. Operations of the flowchart 1300 begin at block 1302.

At block 1302, a shallow mode measurement is made. In some embodiments, in order to make a shallow mode measurement of a pipe, the transmitter is to emit a signal at high frequencies. For example, a signal at high frequencies can include signals at 10 Mega Hertz (MHz) or higher, 5 MHz or higher, 3-10 MHz, etc. Receiving and processing of a signal at high frequencies allows for a focus on the parameters of the inner pipe (shallow mode measurement). In some embodiments, operations for making the shallow mode measurement are depicted in the flowchart 1200 of FIG. 12 (described above), wherein the transmitter generates a signal at a high frequency at block 1202. Thus, based on the operations of the flowchart 1200, an assessment can be made to determine if voltage measurements from cylindrical coils (block 1218) or shaped coils (block 1220) are selected. In the case of shallow mode measurements, noise effects and the effects from moving through a static magnetic field can be less noticeable, and a cylindrical coil measurement can be preferable. In the case of shallow mode measurements using multiple multi-coil probes, channels with greater effective distances can be used if the static magnetic field is below a magnetic field threshold.

At block 1304, the shallow mode measurement is data processed. The shallow mode measurements can be data processed to generate one or more processed measurements. This data processing can include filtering to reduce noise, averaging data from multiple sensors to reduce noise, taking the difference or ratio of multiple voltages to remove unwanted effects such as common voltage drift due to temperature, performing other temperature corrections schemes such as using a temperature correction table, calibrating the measurements to known or expected parameter values from an existing well log, performing array processing (software focusing) of the measurements to achieve different depths of detection or vertical/azimuthal resolution, and removing artifacts. For example, voltage measurement from one coil can be averaged with voltage measurement from another coil. In another example, a known temperature change to coil resistance can be compensated into a known voltage change as a result of temperature.

In addition, environmental properties such as temperature, the effects of sensor housing, pad structure, and mutual coupling between sensors can be corrected by using a priori information of these properties, or by solving for some or all of them during the inversion process. Such effects can be additive, and thus removed through proper processing schemes. Other effects can be multiplicative, and can be compensated for by calibrating the results to an existing log.

In some embodiments, concentric transmitter and receiver pairs may be data processed to account for a double-peak artifact when a probe is scanning in the axial direction as a result of their concentric configuration. For example, with respect to FIG. 7, the signal acquired by the right lower shaped coil 706 and transmitted by the right upper shaped coil 708 can be used to measure the channel 722. When a transmitter and receiver are concentric, such as in the case of the channel 722, double peaks can be observed in the corresponding scans. One peak corresponds to the case when the coil and the receiver are at the same axial position and a much larger peak is in response to the case where a defect is at the focused zone. Proper artifact removal algorithms during an inversion process, such as deconvolution or filtering, can process these channels such that only one peak is observed or used in any processed response.

At block 1306, a determination is made of whether a library or forward-modeling is to be used to compare with the processed measurements. This determination can be based on various criteria. For example, if calculation speed is given priority over accuracy, a library can be used. However, if accuracy is given priority over calculation speed, forward-modeling can be used. If a determination is made to use the library, operations of the flowchart 1300 continue at block 1308. If a determination is made to use forward-modeling, operations of the flowchart 1300 continue at block 1310.

At block 1308, a determination is made of whether the difference between the processed measurement and measurements from a library is more than a library error threshold. The library can be a database of values, wherein measurements can be determined by cross-referencing with reference pipe parameters. In some embodiments, the reference pipe parameters are known at the start of the flowchart 1300. The reference pipe parameters can also be previously determined pipe parameters calculated at block 1318 (further described below). For example, the measurements from the library can include a set of voltage values after cross-referencing an initially guessed corrosion value during a first iteration of block 1308 or a corrosion value based on a previously determined inner pipe parameter during subsequent iterations of block 1308. Also, different reference pipe parameters can be used between two different iterations of block 1308, which can result in different measurements from the library.

The processed measurements can be compared to measurements from the library to find an absolute difference. Alternatively, the processed measurements can be compared to measurements from the library to find a relative difference. The library error threshold can be based on various criteria, including properties of the formation, properties of the piping, etc. In one example, a first iteration of block 1308 can result in finding a difference between the voltage $W1_1$ and the library-determined voltage $W_{lib-1}$ based on a reference pipe parameter $S1_1$. The difference dW is calculated as shown in Equation 17:

$$dW = |W_{lib-1} - W1_1| \quad (17)$$

For example, if the library error threshold is 0.01 V and the calculated dW is 0.25 V, the difference is more than the library error threshold. If the difference between the processed measurements used at block 1304 and the measurements provided by the library are not more than the library error threshold, operations of the flowchart 1300 continue at block 1316. Otherwise, operations of the flowchart 1300 continue at block 1318 to calculate a set of determined inner pipe parameters during a new iteration of numerical inversion.

At block 1318, the processed measurement is numerically inverted to calculate determined inner pipe parameters based on measurements from the library (and previously determined inner pipe parameters). For example, the processed measurement can be a set of voltage measurements over time or distance. In some embodiments, the processed measurements can be used to set up systems of equations and parameter relationships which can include known physical values such as the source signal frequencies, amplitude or spectrum generated by the transmitters. These systems of equations and parameter relationships can also include an initial inner pipe parameter guess such as an inner pipe resistivity guess, magnetic permeability guess, thickness guess or a corrosion value guess. These systems of equations and parameter relationships can then be numerically solved to determine inner pipe parameters. In some embodiments, the processed measurements can be compared with the library using pattern-matching to determine inner pipe parameters. For example, the operation can recognize that a set of processed measurements matches a set of matched measurements in a library. Accordingly, the determined inner pipe parameters can be estimates as the inner pipe parameters are associated with the set of matched measurements.

If previous determined inner pipe parameters are available from a previous numerical inversion operation at block 1318, these previous determined inner pipe parameters can replace the initial inner pipe parameter guesses. For example, a processed voltage measurement W1 can be calculated at block 1304 and a determined inner pipe corrosion value $S1_1$ can be determined at 1318 based on W1 and an initial guessed corrosion value of $S1_0$. As observed above, calculating a difference greater than the library error threshold at block 1308 can return the operation to block 1318 for a next iteration of numerical inversion. At the next iteration of numerical inversion, the inner pipe corrosion can be calculated to be $S1_2$ based on the previous determined inner pipe corrosion value $S1_1$.

At block 1310, a determination is made of whether the difference between the processed measurements and measurements from forward-modeling is less than a modeling error threshold. Forward-modeling can comprise a numerical modeling of the casing, wherein various physics-based or engineering models are applied to predict measurements values based on inputs including the modeling pipe parameters. In some embodiments, the modeling pipe parameters are known at the start of the flowchart 1300. In some embodiments, the modeling pipe parameters are previously determined pipe parameters calculated at block 1320 (described below). For example, the measurements from forward-modeling can include a set of voltage values calculated after using a computer model to simulate the transmission of a known electromagnetic signal through a casing with a guessed corrosion value based on a previously determined inner pipe parameter such as a previously determined corrosion value. In some embodiments, different measurements from forward-modeling can result if different modeling pipe parameters are provided.

In some embodiments, different modeling pipe parameters can be used between two different iterations of block 1310, which can result in different measurements from forward-modeling. In some embodiments, a new processed measurement may be calculated based on the processed measurement and the modeling pipe parameters. For example, voltage $W1_0$ may be calculated into a new processed voltage $W1_{new}$ if the simulation determines that interactions between temperature and corrosion are non-linear and corrects $W1_0$ with a more accurate method of determining the new processed voltage $W1_{new}$. These new processed measurements may replace the original processed measurements.

In some embodiments, the processed measurements can be compared to measurements from forward-modeling to find an absolute difference. In some embodiments, the processed measurements can be compared to measurements from forward-modeling to find a relative difference. The modeling error threshold can be based on various criteria, including properties of the formation, properties of the piping, structure of the downhole system, etc. In one example, a first iteration of block 1308 can result in finding a difference between the voltage $W1_1$ and the forward-modeling-determined voltage $W_{lib-1}$ based on a modeling pipe parameter $S1_1$. The difference $dW_{FWD}$ is calculated as shown in Equation 18:

$$dW_{FWD} = |W_{FWD-1} - W1_1| \quad (18)$$

If the difference between the processed measurements used at block 1310 and the measurements provided by forward-modeling are not more than the modeling error threshold, operations of the flowchart 1300 continue at block 1316. Otherwise, operations of the flowchart 1300 proceeds to block 1320 to calculate a set of determined inner pipe parameters during a new iteration of numerical inversion.

At block 1320, the processed measurement is numerically inverted to calculate determined inner pipe parameters based on measurements from forward-modeling (and previous determined inner pipe parameters). In some embodiments, the processed measurements can be used to set up systems of equations and parameter relationships which can include known physical values such as the source signal frequencies, amplitude or spectrum generated by the transmitters or known coil resistivity values. These systems of equations and parameter relationships can also include an initial inner pipe parameter guess such as an inner pipe resistivity guess, magnetic permeability guess, thickness guess or a corrosion value guess. These systems of equations and parameter relationships can then be numerically solved using forward-modeling and well-known inversion approaches to determine inner pipe parameters such as new resistivity and corrosion values. In addition to calculating the determined inner pipe parameters, forward-modeling can also be used to reprocess the processed measurements into reprocessed measurements.

If previous determined inner pipe parameters are available from a previous numerical inversion operation at block 1320, these previous determined inner pipe parameters can replace the initial inner pipe parameter guesses. For example, a processed voltage measurement W1 can be calculated at block 1304 and a determined inner pipe corrosion value $S1_1$ can be determined at 1320 based on W1 and an initial guessed corrosion value of $S1_1$. As observed above, calculating a difference greater than the modeling error threshold at block 1310 can return the operation to block 1320 for a next iteration of numerical inversion. At the next iteration of numerical inversion, the inner pipe corrosion can be calculated to be $S1_2$ based on the previous determined inner pipe corrosion value $S1_1$.

At block 1316, the inner pipe parameters are set based on the numerical inversion. For example, the inner pipe parameters can be set to the determined inner pipe parameters from the last numerical inversion operation (at block 1318 or block 1320) prior to the difference being not more than the library error threshold at block 1308 or the difference being not more than the modeling error threshold at block 1310. For example, an inner pipe parameter can be an establishment that a pipe collar is present at the inner pipes. The inner pipe parameters can be used in determining if cracks, fatigue, or other conditions requiring maintenance or replacement are present in the inner pipe. Operations of the flowchart 1300 continue at transition point A, which continues at transition point A of the flowchart 1400.

Operations of the flowchart 1400 are now described. From transition point A, operations of the flowchart 1400 continue at 1402. Also, as shown, inner pipe parameters that were set at block 1316 of FIG. 13 can be inputs (1403) for operations at block 1404, 1418, and 1420, as further described below.

At block 1402, a deep mode measurement is made. In some embodiments, in order to make a deep mode measurement of a pipe, the transmitter is to emit a signal at low frequencies. For example, a signal at low frequencies can include signals at 1 MHz or lower, 50 Kilo Hertz (KHz) or lower, 3-100 KHz, etc. Receiving and processing of a signal at low frequencies allows for a focus on the parameters of the outer pipe (deep mode measurement). In some embodiments, operations for making the deep mode measurement are depicted in the flowchart 1200 of FIG. 12 (described above), wherein the transmitter generates a signal at a low frequency at block 1202. Thus, based on the operations of the flowchart 1200, an assessment can be made to determine if voltage measurements from cylindrical coils (block 1218) or shaped coils (block 1220) are selected. In the case of deep mode measurements, noise effects and the effects from moving through a static magnetic field can be more noticeable, and a shaped coil measurement can be preferable. In the case of deep mode measurements using multiple multi-coil probes, channels with reduced effective distances can be used if the static magnetic field is above the magnetic field threshold.

At block 1404, the deep mode measurement is data processed. For example, this data processing can include one or more operations of data processing described above in reference to block 1304 of FIG. 13. Also, as shown, inner pipe parameters (1403) that were set at block 1316 of FIG. 13 can be inputs for operations at block 1404. The inner pipe parameters (1403) can be used to improve the accuracy of the data processing. For example, known or estimated variations of the inner pipe can be used to convert the deep mode measurement $W2_0$ to the processed measurement $W2_1$ by subtracting the contributions of the inner pipe voltage variations $W2_{inner}$ from the deep mode measurement $W2_0$, as shown in Equation 19:

$$W2_1 = W2_0 - W2_{inner} \quad (19)$$

At block 1406, a determination is made of whether a library or forward-modeling is to be used to compare with the processed measurements. This determination can be based on various criteria. For example, if calculation speed is given priority over accuracy, a library can be used. However, if accuracy is given priority over calculation speed, forward-modeling can be used. If a determination is made to use the library, operations of the flowchart 1400 continue at block 1408. If a determination is made to use forward-modeling, operations of the flowchart 1400 continue at block 1410.

At block 1408, a determination is made of whether the difference between the processed measurement and measurements from a library is more than a library error threshold. The library can be a database of values, wherein measurements can be determined by cross-referencing with reference pipe parameters. In some embodiments, the reference pipe parameters are known at the start of the operation 1400. The reference pipe parameters can also be previously determined pipe parameters calculated at block 1418 (described below). For example, the measurements from the library can include a set of voltage values after cross-referencing an initially guessed corrosion value during a first iteration of block 1408 or a corrosion value based on a previously determined inner pipe parameter during subsequent iterations of block 1408. Also, different reference pipe parameters can be used between two different iterations of block 1308, which can result in different measurements from the library. In some embodiments, the inner pipe parameters (1403) can also be used as reference pipe parameters.

The processed measurements can be compared to measurements from the library to find an absolute difference. Alternatively, the processed measurements can be compared to measurements from the library to find a relative difference. The library error threshold can be based on various criteria, including properties of the formation, properties of the piping, etc. In one example, a first iteration of block 1408 can result in finding a difference between the voltage $W2_1$ and the library-determined voltage $W_{lib-2}$ based on a reference pipe parameter $S1_1$. The difference $dW_{outer}$ is calculated as shown in Equation 20:

$$dW_{outer} = |W_{lib-2} - W2_1| \quad (20)$$

If the difference between the processed measurements used at block 1404 and the measurements provided by the library are not more than the library error threshold, operations of the flowchart 1400 continue at block 1416. Otherwise, operations of the flowchart 1400 continue at block 1418 to calculate a set of determined outer pipe parameters during a new iteration of numerical inversion.

At block 1418, the processed measurement is numerically inverted to calculate determined outer pipe parameters based on measurements from the library (and previous determined outer pipe parameters). For example, the processed measurement can be a set of voltage measurements over time or distance. In some embodiments, the processed measurements can be used to set up systems of equations and parameter relationships which can include known physical values such as the magnetic signal frequencies generated by the transmitters or known coil resistivity values. These systems of equations and parameter relationships can also include an initial outer pipe parameter guess such as an outer pipe resistivity guess or a corrosion value guess, wherein the initial outer pipe parameter guess can be based on a measurement from the library. These systems of equations and parameter relationships can then be numerically solved to determine outer pipe parameters such as new resistivity and corrosion values. These systems of equations and parameter relationships can then be numerically solved to determine outer pipe parameters such as new resistivity and corrosion values.

Also, as shown, inner pipe parameters (1403) can be inputs for operations at block 1418. In some embodiments, the systems of equations and parameter relationships mentioned above can also include the inner pipe parameters. For example, an additional relationship to help determine the outer resistance $R_{outer}$ based on known values such as the current I and the voltage $W_{measured}$ and the inner pipe parameter $R_{inner}$ is shown in Equation 21:

$$I*R_{outer} = W_{measured} - I*R_{inner} \quad (21)$$

In some embodiments, the processed measurements can be compared with the library using pattern-matching to determine outer pipe parameters. For example, the operation can recognize that a set of processed measurements matches a set of matched measurements in a library. Accordingly, the determined outer pipe parameters can be determined as the outer pipe parameters that associate with the set of matched measurements.

If previous determined outer pipe parameters are available from a previous numerical inversion operation at block 1418, these previous determined outer pipe parameters can replace the initial outer pipe parameter guesses. For example, a processed voltage measurement $W2_1$ can be calculated at block 1404 and a determined outer pipe corrosion value $S2_1$ can be determined at 1418 based on $W2_1$ and an initial guessed corrosion value of $S2_0$. As observed above, calculating a difference greater than the library error threshold at block 1408 can return the operation to block 1418 for a next iteration of numerical inversion. At the next iteration of numerical inversion, the outer pipe corrosion can be calculated to be $S2_2$ based on the previous determined outer pipe corrosion value $S2_1$.

At block 1310, a determination is made of whether the difference between the processed measurements and measurements from forward-modeling is more than a modeling error threshold. Forward-modeling can comprise a numerical modeling of the casing, wherein various physics-based or engineering models are applied to predict measurements values based on inputs including the modeling pipe parameters. In some embodiments, the modeling pipe parameters are known at the start of the flowchart 1400. In some embodiments, the modeling pipe parameters are previously determined pipe parameters calculated at block 1420 (described below). For example, the measurements from forward-modeling can include a set of voltage values calculated after modeling a known electromagnetic signal traversing through a material with a guessed corrosion value based on a previously determined outer pipe parameter. In some embodiments, different measurements from forward-modeling can result if different modeling pipe parameters are provided. In some embodiments, the inner pipe parameters (1403) can also be used as modeling pipe parameters.

In some embodiments, different modeling pipe parameters can be used between two different iterations of block 1410, which can result in different measurements from forward-modeling. In some embodiments, a new processed measurement may be calculated based on the processed measurement and the modeling pipe parameters. For example, voltage $W2_0$ may be calculated into a new processed voltage $W2_{new}$ if the simulation determines that interactions between temperature and corrosion are non-linear and corrects $W2_0$ with a more accurate method of determining the new processed voltage $W2_{new}$. These new processed measurements may replace the original processed measurements.

In some embodiments, the processed measurements can be compared to measurements from forward-modeling to find an absolute difference. In some embodiments, the processed measurements can be compared to measurements from forward-modeling to find a relative difference. The modeling error threshold can be based on various criteria, including properties of the formation, properties of the piping, structure of the downhole system, etc. In one example, a first iteration of block 1408 can result in finding a difference between the voltage $W1_1$ and the forward-modeling-determined voltage $W_{lib-1}$ based on a modeling pipe parameter $S1_1$. The difference $dW_{FWD-outer}$ is calculated as shown in Equation 22:

$$dW_{FWD-outer} = |W_{FWD-2} - W2_1| \quad (22)$$

If the difference between the processed measurements used at block 1410 and the measurements provided by forward-modeling are not more than the modeling error threshold, operations of the flowchart 1400 continue at block 1416. Otherwise, operations of the flowchart 1400 proceeds to block 1420 to calculate a set of determined outer pipe parameters during a new iteration of numerical inversion.

At block 1420, the processed measurement is numerically inverted to calculate determined outer pipe parameters based on measurements from forward-modeling (and previous determined outer pipe parameters). In some embodiments, the processed measurements can be used to set up systems of equations and parameter relationships which can include known physical values such as the source signal frequencies, amplitude or spectrum generated by the transmitters or known coil resistance values. These systems of equations and parameter relationships can also include an initial outer pipe parameter guess such as an outer pipe resistivity, magnetic permeability guess, thickness guess or a corrosion value guess. These systems of equations and parameter relationships can then be numerically solved using forward modeling and well-known inversion approaches to determine outer pipe parameters such as new resistivity and corrosion values.

If previous determined outer pipe parameters are available from a previous numerical inversion operation at block 1420, these previous determined outer pipe parameters can replace the initial outer pipe parameter guesses. For example, a processed voltage measurement $W2_1$ can be calculated at block 1404 and a determined outer pipe corrosion value $S2_1$ can be determined at 1420 based on $W2_1$ and an initial guessed corrosion value of $S2_0$. As observed above, calculating a difference greater than the modeling error threshold at block 1420 can return the operation to block 1420 for a next iteration of numerical inversion. At the next iteration of numerical inversion, the outer pipe corrosion can be calculated to be $S2_2$ based on the previous determined inner pipe corrosion value $S2_1$. In some embodiments, the new processed measurement $W2_2$ as determined at block 1410 can also be used to determine the outer pipe corrosion.

At block 1416, the outer pipe parameters are set based on the numerical inversion. For example, the outer pipe parameters can be set to the determined outer pipe parameters from the last numerical inversion operation (at block 1418 or block 1420) prior to the difference being not more than the library error threshold at block 1408 or the difference being not more than the modeling error threshold at block 1410. For example, an outer pipe parameter can be an establishment that a pipe collar is present at the outer pipes. The outer pipe parameters can be used in determining if cracks, fatigue, or other conditions requiring maintenance or replacement are present in the outer pipe. In some embodiments, inner or outer pipe parameters that suggest altered conductivity at the edges of any pipe from a baseline value can be indicative of corrosion or degradation, which can require further investigation or a repair/replacement operation. Once these features are identified, repair or replacement operations can be performed to prevent further corrosion or degradation.

Example Computer Device

Figure 15:
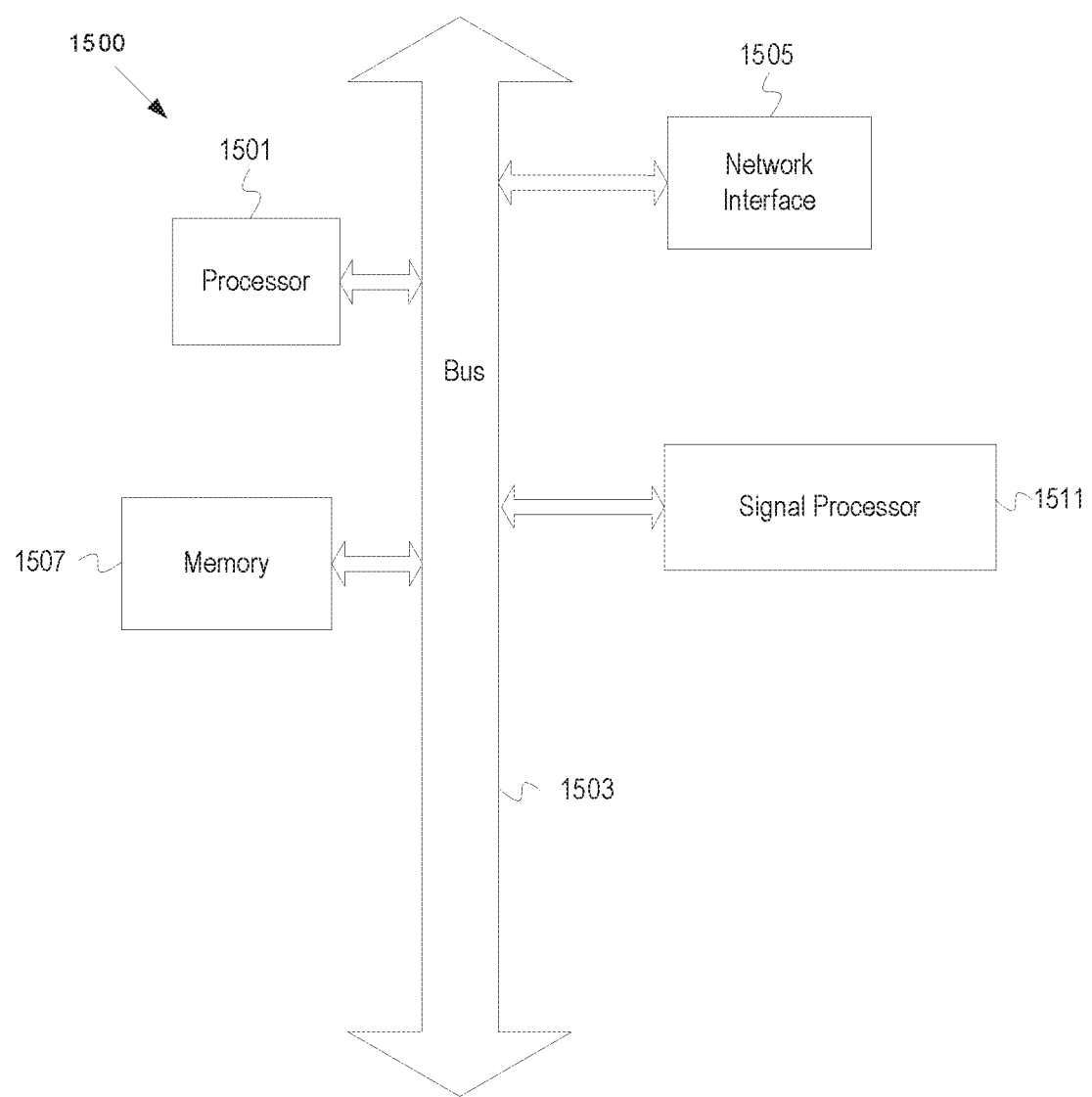
FIG. 15 depicts an example computer device, according to some embodiments.

FIG. 15 depicts an example computer device, according to some embodiments. A computer device 1500 includes a processor 1501 (possibly including multiple processors, multiple cores, multiple nodes, and/or implementing multithreading, etc.). The computer device 1500 includes a memory 1507. The memory 1507 can be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer device 1500 also includes a bus 1503 (e.g., PCI, ISA, PCI-Express, HyperTransport® bus, InfiniBand® bus, NuBus, etc.) and a network interface 1505 (e.g., a Fiber Channel interface, an Ethernet interface, an internet small computer system interface, SONET interface, wireless interface, etc.).

The computer device 1500 includes a signal processor 1511. The signal processor 1511 can perform one or more operations described above. For example, the signal processor 1511 can perform operations depicted in FIGS. 12-14 to determine parameters of pipe (as described above). Any one of the previously described functionalities can be partially (or entirely) implemented in hardware and/or on the processor 1501. For example, the functionality can be implemented with an application specific integrated circuit, in logic implemented in the processor 1501, in a co-processor on a peripheral device or card, etc. Further, realizations can include fewer or additional components not illustrated in FIG. 15 (e.g., video cards, audio cards, additional network interfaces, peripheral devices, etc.). The processor 1501 and the network interface 1505 are coupled to the bus 1503. Although illustrated as being coupled to the bus 1503, the memory 1507 can be coupled to the processor 1501. The computer device 1500 can be device at the surface and/or integrated into component(s) in the wellbore.

As will be appreciated, aspects of the disclosure can be embodied as a system, method or program code/instructions stored in one or more machine-readable media. Accordingly, aspects can take the form of hardware, software (including firmware, resident software, micro-code, etc.), or a combination of software and hardware aspects that can all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) can be utilized. The machine-readable medium can be a machine-readable signal medium or a machine-readable storage medium. A machine-readable storage medium can be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium can be any tangible medium that can contain, or store a program for use by or in connection with an instruction execution system, apparatus, or device. A machine-readable storage medium is not a machine-readable signal medium.

A machine-readable signal medium can include a propagated data signal with machine readable program code embodied therein, for example, in baseband or as part of a carrier wave. Such a propagated signal can take any of a variety of forms, including, but not limited to, electromagnetic, optical, or any suitable combination thereof. A machine-readable signal medium can be any machine readable medium that is not a machine-readable storage medium and that can communicate, propagate, or transport a program for use by or in connection with an instruction execution system, apparatus, or device.

Program code embodied on a machine-readable medium can be transmitted using any appropriate medium, including but not limited to wireless, wireline, optical fiber cable, RF, etc., or any suitable combination of the foregoing.

Computer program code for carrying out operations for aspects of the disclosure can be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code can execute entirely on a stand-alone machine, can execute in a distributed manner across multiple machines, and can execute on one machine while providing results and or accepting input on another machine.

The program code/instructions can also be stored in a machine-readable medium that can direct a machine to function in a particular manner, such that the instructions stored in the machine-readable medium produce an article of manufacture including instructions which implement the function/act specified in the flowchart and/or block diagram block or blocks.

Plural instances can be provided for components, operations or structures described herein as a single instance. Finally, boundaries between various components, operations and data stores are somewhat arbitrary, and particular operations are illustrated in the context of specific illustrative configurations. Other allocations of functionality are envisioned and can fall within the scope of the disclosure. In general, structures and functionality presented as separate components in the example configurations can be implemented as a combined structure or component. Similarly, structures and functionality presented as a single component can be implemented as separate components. These and other variations, modifications, additions, and improvements can fall within the scope of the disclosure.

Example Embodiments

Example embodiments include the following.

Embodiment 1: A method comprising: disposing a tool longitudinally in a wellbore that is lined with a pipe, wherein the tool comprises a first receiver coil having a non-uniform winding along a longitudinal axis, a second receiver coil having a non-uniform winding along the longitudinal axis, and a third receiver coil having a non-uniform winding, wherein the third receiver coil is coaxial with at least one of the first receiver coil and the second receiver coil; emitting, by a transmitter, a first induced magnetic field that traverses the pipe; measuring the first induced magnetic field after traversing the pipe using the first receiver coil to create a first measurement; measuring the first induced magnetic field after traversing the pipe using the first receiver coil and the second receiver coil to create a second measurement; and determining a static magnetic field; performing a first selection of the first measurement or the second measurement based on a magnitude of the static magnetic field to determine a first selected measurement; and determining at least one property of the pipe using the first selected measurement.

Embodiment 2: The method of Embodiment 1, wherein the following operations are performed while the tool is moving longitudinally in the wellbore: the emitting of the first induced magnetic field, the measuring of the first induced magnetic field after traversing the pipe using the first receiver coil, and the measuring the first induced magnetic field after traversing the pipe using the first receiver coil and the second receiver coil.

Embodiment 3: The method of Embodiments 1 or 2, wherein the first receiver coil comprises of: a first portion of the first receiver coil having a distinct number of turns per longitudinal length different from a second portion of the first receiver coil; and the first portion having a cross sectional winding area which is distinct from that of the second portion.

Embodiment 4: The method of any of Embodiments 1-3, wherein the second receiver coil is wrapped around the first receiver coil.

Embodiment 5: The method of any of Embodiments 1-4, wherein selecting the first measurement or the second measurement comprises: determining whether the static magnetic field is greater than a magnetic field threshold; in response to determining that the static magnetic field is greater than the magnetic field threshold, selecting the first measurement; and in response to determining that the static magnetic field is less than the magnetic field threshold, selecting the second measurement.

Embodiment 6: The method of any of Embodiments 1-5, further comprising: determining whether a magnetic anomaly is present through modeling; and in response to determining that the magnetic anomaly is present, selecting the first measurement or the second measurement based on the magnetic anomaly.

Embodiment 7: The method of any of Embodiments 1-6, wherein emitting, by the transmitter, the first induced magnetic field comprises emitting, by the transmitter, the first induced magnetic field in a shallow mode at a first frequency, and wherein determining the at least one property of the pipe using the first selected measurement comprises determining the at least one property of an inner portion of the pipe.

Embodiment 8: The method of any of Embodiments 1-7, further comprising: while the tool is moving longitudinally in the wellbore, emitting, by the transmitter, a second induced magnetic field that traverses the pipe in a deep mode at a second frequency that is lower than the first frequency; measuring the second induced magnetic field after traversing the pipe using the first receiver coil to create a third measurement; and measuring the second induced magnetic field after traversing the pipe using the first receiver coil and the second receiver coil to create a fourth measurement; performing a second selection of the third measurement or the fourth measurement based on the magnitude of the static magnetic field to determine a second selected measurement; and determining at least one property of an outer portion of the pipe based on the second selected measurement and based on the at least one property of the inner portion of the pipe.

Embodiment 9: A system comprising: a tool to dispose longitudinally in a wellbore that is lined with a pipe, the tool comprising, a first receiver coil having a non-uniform winding along a longitudinal axis; a second receiver coil having a non-uniform winding along the longitudinal axis; a third receiver coil having a non-uniform winding, wherein the third receiver coil is coaxial with at least one of the first receiver coil and the second receiver coil; and a transmitter; a processor; and a computer-readable storage medium having instructions stored which, when executed by the processor, cause the processor to perform operations comprising: causing the transmitter to emit a first induced magnetic field that traverses the pipe; measuring the first induced magnetic field after traversing the pipe using the first receiver coil to create a first measurement; measuring the first induced magnetic field after traversing the pipe using the first receiver coil and the second receiver coil to create a second measurement; determining a static magnetic field; selecting the first measurement or the second measurement based on a magnitude of the static magnetic field to determine a first selected measurement; and determining at least one property of the pipe using the first selected measurement.

Embodiment 10: The system of Embodiment 9, wherein the following operations are performed while the tool is moved longitudinally in the wellbore: the causing of the first transmitter to emit the first induced magnetic field, the measuring of the first induced magnetic field after traversing the pipe using the first receiver coil, the measuring the first induced magnetic field after traversing the pipe using the first receiver coil and the second receiver coil, the determining of the static magnetic field, and the performing of the first selection.

Embodiment 11: The system of Embodiments 9 or 10, wherein the first receiver coil comprises of: a first portion of the first receiver coil having a distinct number of turns per longitudinal length different from a second portion of the first receiver coil; and the first portion having a cross sectional winding area which is distinct from that of the second portion.

Embodiment 12: The system of any of Embodiments 9-11, wherein a hollowed, cylindrical shape is formed from coils that comprise the first receiver coil and the second receiver coil.

Embodiment 13: The system of any of Embodiments 9-12, wherein the second receiver coil is coaxial with the first receiver coil and is wrapped around the first receiver coil.

Embodiment 14: The system of any of Embodiments 9-13, wherein selecting the first measurement or the second measurement comprises: determining whether the static magnetic field is greater than a magnetic field threshold; in response to determining that the static magnetic field is greater than the magnetic field threshold, selecting the first measurement; and in response to determining that the static magnetic field is less than the magnetic field threshold, selecting the second measurement.

Embodiment 15: The system of any of Embodiments 9-14, wherein emitting, by the transmitter, the first induced magnetic field comprises emitting, by the transmitter, the first induced magnetic field in a shallow mode at a first frequency, and wherein determining the at least one property of the pipe using the first selected measurement comprises determining the at least one property of an inner portion of the pipe.

Embodiment 16: The system of any of Embodiments 9-15, wherein the operations further comprise: while the tool is moving longitudinally in the wellbore, causing the transmitter to emit a second induced magnetic field that traverses the pipe in a deep mode at a second frequency that is lower than the first frequency; measuring the second induced magnetic field after traversing the pipe using the first receiver coil to create a third measurement; and measuring the second induced magnetic field after traversing the pipe using the first receiver coil and the second receiver coil to create a fourth measurement; performing a second selection of the third measurement or the fourth measurement based on the magnitude of the static magnetic field to determine a second selected measurement; and determining at least one property of an outer portion of the pipe based on the second selected measurement and based on the at least one property of the inner portion of the pipe.

Embodiment 17: An apparatus comprising: a first receiver coil having a non-uniform winding along a longitudinal axis; a second receiver coil having a non-uniform winding along the longitudinal axis; and a third receiver coil having a non-uniform winding, wherein the third receiver coil is coaxial with at least one of the first receiver coil and the second receiver coil.

Embodiment 18: The apparatus of Embodiment 17, wherein the second receiver coil is wrapped around the first receiver coil.

Embodiment 19: The apparatus of Embodiments 17 or 18, wherein the third receiver coil is wrapped around the first receiver coil.

Embodiment 20: The apparatus of any of Embodiments 17-19, wherein a hollowed, cylindrical shape is formed from coils that comprise the first receiver coil and the second receiver coil.

What is claimed is:

1. A method comprising:
    disposing a tool longitudinally in a wellbore that is lined with multiple concentric pipes, wherein the tool comprises at least one first receiver coil having a non-uniform winding along a longitudinal axis and a second receiver coil having at least one of a uniform winding and a non-uniform winding along the longitudinal axis;
    emitting, by a transmitter, a first induced magnetic field at a first frequency that traverses the multiple concentric pipes;
    measuring the first induced magnetic field after traversing the multiple concentric pipes using the at least one first receiver coil to create a first measurement;
    measuring the first induced magnetic field after traversing the multiple concentric pipes using the at least one first receiver coil and the second receiver coil to create a second measurement;
    determining a static magnetic field;
    performing a first selection of the first measurement or the second measurement based on a magnitude of the static magnetic field to determine a first selected measurement;
    determining at least one property of an inner portion of the multiple concentric pipes using the first selected measurement; and
    determining at least one property of an outer portion of the multiple concentric pipes based on a second selected measurement and the at least one property of the inner portion of the multiple concentric pipes.

2. The method of claim 1, wherein the following operations are performed while the tool is moving longitudinally in the wellbore:
    the emitting of the first induced magnetic field,
    the measuring of the first induced magnetic field after traversing the multiple concentric pipes using the at least one first receiver coil, and
    the measuring the first induced magnetic field after traversing the multiple concentric pipes using the at least one first receiver coil and the second receiver coil.

3. The method of claim 1, wherein the at least one first receiver coil comprises of:
    a first portion of the at least one first receiver coil having a distinct number of turns per longitudinal length different from a second portion of the at least one first receiver coil; and
    the first portion having a cross sectional winding area which is distinct from that of the second portion.

4. The method of claim 1, wherein the second receiver coil is wrapped around the at least one first receiver coil.

5. The method of claim 1, wherein selecting the first measurement or the second measurement comprises:
    determining whether the static magnetic field is greater than a magnetic field threshold;

in response to determining that the static magnetic field is greater than the magnetic field threshold, selecting the first measurement; and
in response to determining that the static magnetic field is less than the magnetic field threshold, selecting the second measurement.

6. The method of claim 1, further comprising:
determining whether a magnetic anomaly is present through modeling; and
in response to determining that the magnetic anomaly is present, selecting the first measurement or the second measurement based on the magnetic anomaly.

7. The method of claim 1, wherein determining the at least one property of the outer portion of the multiple concentric pipes further comprises:
while the tool is moving longitudinally in the wellbore,
emitting, by the transmitter, a second induced magnetic field that traverses the multiple concentric pipes in a deep mode at a second frequency that is lower than the first frequency;
measuring the second induced magnetic field after traversing the multiple concentric pipes using the at least one first receiver coil to create a third measurement; and
measuring the second induced magnetic field after traversing the multiple concentric pipes using the at least one first receiver coil and the second receiver coil to create a fourth measurement;
performing a second selection of the third measurement or the fourth measurement based on the magnitude of the static magnetic field to determine the second selected measurement.

8. A system comprising:
a tool to dispose longitudinally in a wellbore that is lined with multiple concentric pipes, the tool comprising,
a transmitter to emit a first induced magnetic field at a first frequency;
at least one first receiver coil having a non-uniform winding along a longitudinal axis, wherein the at least one first receiver coil is to measure the first induced magnetic field to create a first measurement; and
a second receiver coil having at least one of a uniform winding and a non-uniform winding along the longitudinal axis, wherein the second receiver coil is to measure the first induced magnetic field after traversing the multiple concentric pipes, wherein measurement of the first induced magnetic field by the at least one first receiver coil and the second receiver coil is to create a second measurement; and
a processor; and
a non-transitory machine readable medium having program code executable by the processor to cause the system to:
determine a static magnetic field;
select the first measurement or the second measurement based on a magnitude of the static magnetic field to determine a first selected measurement;
determine at least one property of an inner portion of the multiple concentric pipes using the first selected measurement; and
determine at least one property of an outer portion of the multiple concentric pipes based on a second selected measurement and the at least one property of the inner portion of the multiple concentric pipes.

9. The system of claim 8, wherein the following operations are performed while the tool is moved longitudinally in the wellbore:
emission of the first induced magnetic field,
measurement of the first induced magnetic field after traversing the multiple concentric pipes using the at least one first receiver coil, and
measurement of the first induced magnetic field after traversing the multiple concentric pipes using the at least one first receiver coil and the second receiver coil.

10. The system of claim 8, wherein the at least one first receiver coil comprises of:
a first portion of the at least one first receiver coil having a distinct number of turns per longitudinal length different from a second portion of the at least one first receiver coil; and
the first portion having a cross sectional winding area which is distinct from that of the second portion.

11. The system of claim 8, wherein the second receiver coil is coaxial with the at least one first receiver coil and is wrapped around the at least one first receiver coil, and wherein a hollowed, cylindrical shape is formed from coils that comprise the at least one first receiver coil and the second receiver coil.

12. The system of claim 8, wherein the second receiver coil is coaxial with the first receiver coil and is wrapped around the first receiver coil.

13. The system of claim 8, wherein the program code executable by the processor to cause the system to select the first measurement or the second measurement comprises program code executable by the processor to cause the system to:
determine whether the static magnetic field is greater than a magnetic field threshold;
in response to determining that the static magnetic field is greater than the magnetic field threshold, select the first measurement; and
in response to determining that the static magnetic field is less than the magnetic field threshold, select the second measurement.

14. The system of claim 8, wherein determining the at least one property of the outer portion of the multiple concentric pipes further comprises:
while the tool is moving longitudinally in the wellbore,
the transmitter is to emit a second induced magnetic field that traverses the multiple concentric pipes in a deep mode at a second frequency that is lower than the first frequency;
the at least one first receiver coil is to measure the second induced magnetic field after traversing the multiple concentric pipes to create a third measurement; and
the second receiver coil is to measure the second induced magnetic field after traversing the multiple concentric pipes, wherein measurement of the second induced magnetic field by the at least one first receiver coil and the second receiver coil is to create a fourth measurement;
wherein the program code comprises program code executable by the processor to cause the system to,
perform a second selection of the third measurement or the fourth measurement based on the magnitude of the static magnetic field to determine the second selected measurement.

15. The system of claim 8, wherein the at least one of a uniform winding of the second receiver coil includes a constant number of turns per longitudinal length and a constant cross sectional winding area.

16. An apparatus comprising:
 a transmitter to emit a first induced magnetic field at a first frequency;
 at least one first receiver coil having a non-uniform winding along a longitudinal axis, wherein the at least one first receiver coil is to measure the first induced magnetic field to create a first measurement; and
 a second receiver coil having at least one of a uniform winding and a non-uniform winding along the longitudinal axis, wherein the second receiver coil is to measure the first induced magnetic field after traversing multiple concentric pipes, wherein measurement of the first induced magnetic field by the at least one first receiver coil and the second receiver coil is to create a second measurement;
 the transmitter, the at least one first receiver coil, and the second receiver coil configured to reside on a tool configured to be disposed in a wellbore that is lined with the multiple concentric pipes;
 a processor; and
 a non-transitory machine readable medium having program code executable by the processor to cause the apparatus to:
  determine a static magnetic field;
  select the first measurement or the second measurement based on a magnitude of the static magnetic field to determine a first selected measurement;
  determine at least one property of an inner portion of the multiple concentric pipes using the first selected measurement; and
  determine at least one property of an outer portion of the multiple concentric pipes based on a second selected measurement and the at least one property of the inner portion of the multiple concentric pipes.

17. The apparatus of claim 16, wherein the second receiver coil is wrapped around the first receiver coil.

18. The apparatus of claim 16, wherein a third receiver coil is wrapped around the first receiver coil.

19. The apparatus of claim 16, wherein the second receiver coil is wrapped around the at least one first receiver coil, and wherein a hollowed, cylindrical shape is formed from coils that comprise the at least one first receiver coil and the second receiver coil.

20. The apparatus of claim 16, wherein the at least one of a uniform winding of the second receiver coil includes a constant number of turns per longitudinal length and a constant cross sectional winding area.

21. The apparatus of claim 16, wherein the second receiver coil is not wrapped around the at least one first receiver coil.

* * * * *